(12) United States Patent
Hirabayashi et al.

(10) Patent No.: US 8,483,025 B2
(45) Date of Patent: Jul. 9, 2013

(54) DATA RECORDING AND REPRODUCING APPARATUS AND DATA LIBRARY DEVICE

(75) Inventors: Masayuki Hirabayashi, Yokohama (JP); Osamu Kawamae, Kawasaki (JP)

(73) Assignee: Hitachi Consumer Electroncis Co., Ltd., Tokyo (JP)

( * ) Notice: Subject to any disclaimer, the term of this patent is extended or adjusted under 35 U.S.C. 154(b) by 0 days.

(21) Appl. No.: 13/451,607

(22) Filed: Apr. 20, 2012

(65) Prior Publication Data
US 2012/0275281 A1 Nov. 1, 2012

(30) Foreign Application Priority Data

Apr. 27, 2011 (JP) .................................. 2011-098944
Jul. 29, 2011 (JP) .................................. 2011-166186

(51) Int. Cl.
*G11B 5/09* (2006.01)
(52) U.S. Cl.
USPC ..................... 369/47.16; 369/47.1; 369/53.11; 369/59.1
(58) Field of Classification Search
None
See application file for complete search history.

(56) References Cited

U.S. PATENT DOCUMENTS
2001/0043797 A1* 11/2001 Tachibana ....................... 386/70

FOREIGN PATENT DOCUMENTS
JP  2004-192680  7/2004

* cited by examiner

*Primary Examiner* — Muhammad N Edun
(74) *Attorney, Agent, or Firm* — Antonelli, Terry, Stout & Kraus, LLP.

(57) ABSTRACT

A data recording and reproducing apparatus relative to a data library device includes a plurality of setup units for recording and reproducing data in a record and reproduction condition appropriate to a recording medium, and a storage unit for storing identification information and medium information of the recording medium, in this way, a setup processing is performed to reproduce the identification information from the recording medium when loading the recording medium, the medium information corresponding to the identification information is read out from the storage unit to perform the setup processing by a second setup unit when the medium information corresponding to the identification information is present in the storage unit, and the setup processing is performed by a third setup unit to reproduce the medium information from the recording medium and store in the storage unit together with the identification information, shortening a time period of the setup processing.

8 Claims, 26 Drawing Sheets

FIG.3

| IDENTIFICATION INFORMATION | | MEDIUM INFORMATION | | | SETUP INFORMATION | | |
|---|---|---|---|---|---|---|---|
| PRODUCT NUMBER | SERIAL NUMBER | DISC TYPE | DISC LAYER | FINALIZED | TR ADJUSTMENT VALUE | FE ADJUSTMENT VALUE | BM ADJUSTMENT VALUE |
| 156h | 00001961h | BD-R | 0 | FINISHED | 02h | 03h | 10h |
| 156h | 00001962h | BD-R | 0 | FINISHED | 04h | 05h | 11h |
| 158h | 00001964h | BD-R | 0 | UNFINISHED | 07h | 08h | 21h |
| 158h | 00001964h | BD-R | 1 | UNFINISHED | 09h | 10h | 22h |
| 312Bh | 00001970h | BD-RE | 0 | FINISHED | 27h | 28h | 24h |
| 126Ch | 00001981h | BD-R | 0 | FINISHED | 27h | 28h | 25h |
| 186h | 00001986h | BD-R | 0 | UNFINISHED | 25h | 26h | 2Bh |
| 187h | 00001987h | BD-RE | 0 | FINISHED | 27h | 28h | 30h |
| 187h | 00001987h | BD-RE | 1 | FINISHED | 27h | 28h | 31h |
| ⋮ | ⋮ | ⋮ | ⋮ | ⋮ | ⋮ | ⋮ | ⋮ |

FIG.5

| IDENTIFICATION INFORMATION | | MEDIUM INFORMATION | | | SETUP INFORMATION | | |
|---|---|---|---|---|---|---|---|
| PRODUCT NUMBER | SERIAL NUMBER | DISC TYPE | DISC LAYER | FINALIZED | TR ADJUSTMENT VALUE | FE ADJUSTMENT VALUE | BM ADJUSTMENT VALUE |
| 156h | 00001961h | BD-R | 0 | FINISHED | 22h | 23h | 20h |
| 156h | 00001961h | BD-R | 0 | FINISHED | 24h | 23h | 31h |
| 158h | 00001964h | BD-R | 0 | UNFINISHED | 27h | 28h | 41h |
| 158h | 00001964h | BD-R | 1 | UNFINISHED | 29h | 30h | 42h |
| 312Bh | 00001970h | BD-RE | 0 | FINISHED | 47h | 48h | 44h |
| 126Ch | 00001981h | BD-R | 0 | FINISHED | 47h | 48h | 45h |
| 186h | 00001986h | BD-R | 0 | UNFINISHED | 45h | 46h | 2Bh |
| 187h | 00001987h | BD-RE | 0 | FINISHED | 47h | 48h | 50h |
| 187h | 00001987h | BD-RE | 1 | FINISHED | 47h | 48h | 51h |
| ⋮ | ⋮ | ⋮ | ⋮ | ⋮ | ⋮ | ⋮ | ⋮ |

| IDENTIFICATION INFORMATION | | MEDIUM INFORMATION | |
|---|---|---|---|
| PRODUCT NUMBER | SERIAL NUMBER | DISC TYPE | DISC LAYER |
| 156h | 00001961h | BD-R | 0 |
| 156h | 00001962h | BD-R | 0 |
| 158h | 00001964h | BD-R | 0 |
| 158h | 00001964h | BD-R | 1 |
| 312Bh | 00001970h | BD-RE | 0 |
| 126Ch | 00001981h | BD-R | 0 |
| 186h | 00001986h | BD-R | 0 |
| 187h | 00001987h | BD-RE | 0 |
| 187h | 00001987h | BD-RE | 1 |
| ⋮ | ⋮ | ⋮ | ⋮ |

FIG.23

| IDENTIFICATION INFORMATION | | MEDIUM INFORMATION | | SETUP INFORMATION | | |
|---|---|---|---|---|---|---|
| PRODUCT NUMBER | SERIAL NUMBER | DISC TYPE | DISC LAYER | TR ADJUSTMENT VALUE | FO ADJUSTMENT VALUE | BE ADJUSTMENT VALUE |
| 156h | 00001961h | BD-R | 0 | 02h | 03h | 10h |
| 156h | 00001962h | BD-R | 0 | 04h | 05h | 11h |
| 158h | 00001964h | BD-R | 0 | 07h | 08h | 21h |
| 158h | 00001964h | BD-R | 1 | 09h | 10h | 22h |
| 312Bh | 00001970h | BD-RE | 0 | 27h | 28h | 24h |
| 126Ch | 00001981h | BD-R | 0 | 27h | 28h | 25h |
| 186h | 00001986h | BD-R | 0 | 25h | 26h | 2Bh |
| 187h | 00001987h | BD-RE | 0 | 27h | 28h | 30h |
| 187h | 00001987h | BD-RE | 1 | 27h | 28h | 31h |
| ⋮ | ⋮ | ⋮ | ⋮ | ⋮ | ⋮ | ⋮ |

FIG.27

| IDENTIFICATION INFORMATION | | MEDIUM INFORMATION | | SETUP INFORMATION | | | |
|---|---|---|---|---|---|---|---|
| PRODUCT NUMBER | SERIAL NUMBER | DISC TYPE | DISC LAYER | TR ADJUSTMENT VALUE | FO ADJUSTMENT VALUE | BE ADJUSTMENT VALUE | APPARATUS NUMBER |
| 156h | 00001961h | BD-R | 0 | 02h | 03h | 10h | 1 |
| 156h | 00001962h | BD-R | 0 | 04h | 05h | 11h | 2 |
| 158h | 00001964h | BD-R | 0 | 07h | 08h | 21h | 4 |
| 158h | 00001964h | BD-R | 1 | 09h | 10h | 22h | 4 |
| 312Bh | 00001970h | BD-RE | 0 | 27h | 28h | 24h | 3 |
| 126Ch | 00001981h | BD-R | 0 | 27h | 28h | 25h | 1 |
| 186h | 00001986h | BD-R | 0 | 25h | 26h | 2Bh | 1 |
| 187h | 00001987h | BD-RE | 0 | 27h | 28h | 30h | 2 |
| 187h | 00001987h | BD-RE | 1 | 27h | 28h | 31h | 2 |
| 126Ch | 00001981h | BD-R | 0 | 25h | 22h | 20h | 2 |
| 126Ch | 00001981h | BD-R | 0 | 1Eh | 1Ah | 16h | 4 |
| ... | ... | ... | ... | ... | ... | ... | ... |

DATA RECORDING AND REPRODUCING APPARATUS AND DATA LIBRARY DEVICE

INCORPORATION BY REFERENCE

The present application claims priorities from Japanese applications JP 2011-098944 filed on Apr. 27, 2011 and JP2011-166186 filed on Jul. 29, 2011, the contents of which are hereby incorporated by reference into this application.

BACKGROUND OF THE INVENTION

The present invention relates to a data recording and reproducing apparatus and a data library device.

There has been JP-A-2004-192680, as related art, disclosing an object such that a disc apparatus capable of using plural recording mediums, each of which has a different standard, provides an advantage of becoming a short time period of until a setup is completed. This document also discloses solution means such that the disc apparatus capable of using the plural recording mediums, each of which has the different standard, configures to designate (set) a disc type (standard) of the recording medium to which a setup processing is applied in a top priority in advance.

SUMMARY OF THE INVENTION

The JP-A-2004-192680 capable of using the plural recording mediums, each of which has the different standard, discloses a configuration for becoming a short time period of until the setup processing is completed. However, even in the recording mediums having the same standard, the data recording and reproducing apparatus has a longer setup time period, compared with a data reproducing apparatus, since the setup processing for data record and reproduction generally has many adjustment points more than that for the time period of the setup time processing for the data reproduction. Therefore, an object of the invention is to provide a data recording and reproducing apparatus capable of becoming short of the setup time, even in the data recording and reproducing apparatus and data library device.

Further, in the JP-A-2004-192680, a determination of the disc type starts from determining whether this type is an optical disc of the top priority designated previously to make the time period short, required for the setup processing. However, a recording type disc, such as BD-R (Blu-ray Disc Recordable), requires a time for the setup processing, compared with a reproduction-dedicated disc, such as BD-ROM (Blu-ray Disc Read Only Memory), even though the determination starts from determining whether the type is the optical disc of the top priority designated previously. This is because the adjustment points increases due to the record for data and data is not written initially into BD-R different from BD-ROM written with data previously. To this end, the setup processing of BD-ROM has a processing for calculating an optimum value of various type settings by reproducing a data area and searching a point at which amplitude of the data area becomes maximum, for example. However, in the case of the setup processing of BD-R, in consideration of the unrecorded data area, since the optimum value of various type settings is calculated only by a pre-write area of 32 clusters, regardless of recorded or unrecorded, numerous times of a seek step are required on the processing. As a result, the time period of setup processing becomes longer. In the case of considering the data library device, one optical disc is sometimes recorded or reproduced by plural drives. In this case, a setup value good for the optical disc on one drive is not exclusively fitted to the setup value good for the other drives. Therefore, another object of the invention is to provide the data recording and reproducing apparatus and data library device capable of shortening the setup processing time period.

The object of the invention can be realized by switching a setup unit with use of identification information of a recording medium.

Another object of the invention can be realized by providing a good setup value for each of the drives for one optical disc, for example.

According to the invention, the setup time period of the data recording and reproducing apparatus can be shortened.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing a content of a memory in the data recording and reproducing apparatus in the first embodiment;

FIG. 5 is a table showing the content of the data recording and reproducing apparatus in the second embodiment;

FIG. 23 is a table showing the contents in the memory in the data recording and reproducing apparatus in the eleventh embodiment;

FIG. 27 is a table showing the contents in the memory in the data recording and reproducing apparatus in the twelfth embodiment.

DESCRIPTION OF THE EMBODIMENTS

Hereinafter, embodiments will be described with reference to the drawings.

Embodiment 1

Figure 1:
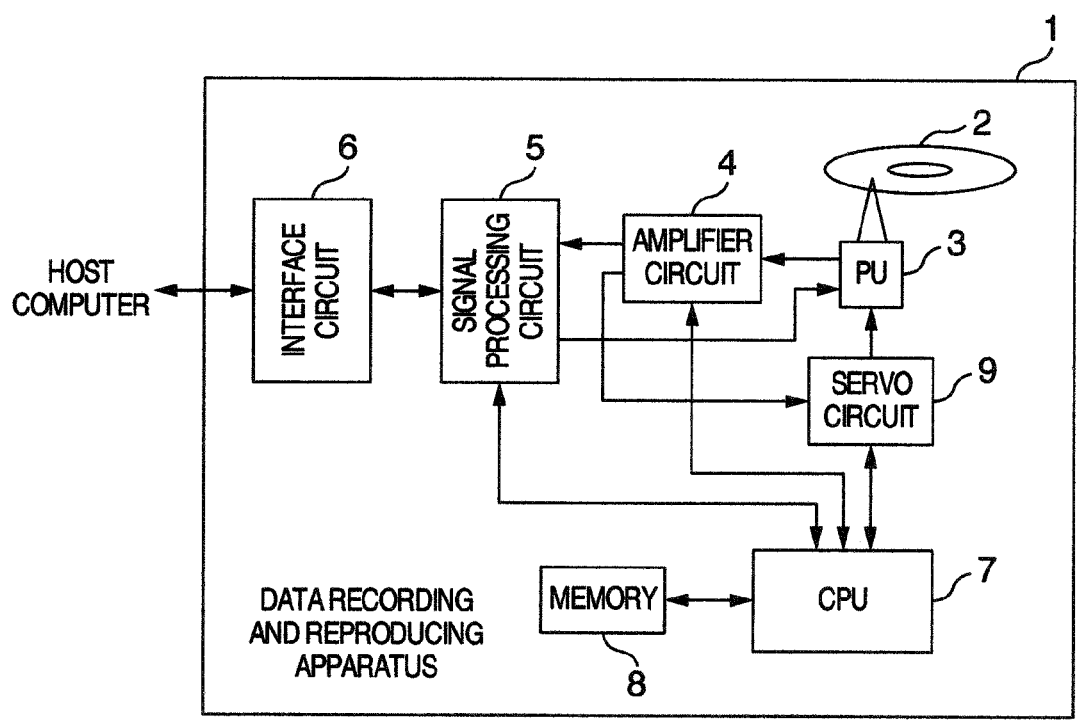
FIG. 1 is a block diagram showing a configuration of a data recording and reproducing apparatus in a first embodiment of the invention.

FIG. 1 is a block diagram showing a configuration of a data recording and reproducing apparatus in a first embodiment of the invention. In FIG. 1, a reference numeral 1 denotes a data recording and reproducing apparatus to record data, received from a host computer, in a recording medium and supply reproduced data from the recording medium to the host computer. A numeral 2 denotes a data recording medium, for example, BD-R (Blu-ray Disc Recordable). In addition, the data recording medium 2 will be taken as an optical disc 2 in the following description. The data recording medium is not necessarily limited to the optical disc, and a magnet-optical disc, hologram, etc. may also be used as recording medium.

A reference numeral 3 denotes an optical pickup for reading out a signal from the optical disc 2 and sending it to an amplifier circuit 4, and also for recording a modulated signal, sent from a signal processing circuit 5, in the optical disc 2.

The amplifier circuit 4 amplifies a reproduced signal read out from the optical disc 2 via the optical pickup 3 to send to the signal processing circuit 5, and also generates a servo signal to be sent to a servo circuit 9. The amplifier circuit 4 is incorporated with AFE (Analog Front End), for example.

The signal processing circuit 5 demodulates the received signal, releases an interleaving, performs an error correction, and sends scramble released data to an interface circuit 6. The signal processing circuit 5 also applies a scramble to the data sent from the interface circuit 6, appends an error-correcting code to it, applies the interleaving to it, modulates it, and send it to the optical pickup 3.

The interface circuit 6 sends the data sent from the signal processing circuit 5 to the host computer and also sends the data sent from the host computer to the signal processing circuit 5. The interface circuit 6 performs a data transfer implemented in relation to a transmission mode, such as SATA (Serial Advanced Technology Attachment) etc.

A reference numeral 7 denotes CPU (Central Processing Unit) for controlling a record processing and a reproduction processing of the data recording and reproducing apparatus 1. The CPU 7 also acquires setup information optimum for recording or reproducing the optical disc 2 to write into a memory 8 together with identification information. The CPU 7 further reads out the setup information and medium information corresponding to the identification information from the memory 8. In addition, an arbitrary control circuit and a dedicated circuit such as ASIC etc. may also be replaced with CPU.

The memory 8 stores the setup information and medium information together with the identification information. In addition, the identification information means a product number and a serial number recorded in BCA (Burst Cutting Area). The setup information means an optimum setting value and learning result for when recording or reproducing the optical disc 2, such as a gain and offset of the amplifier circuit, an adjustment learning value of servo, etc., and also information used to be acquired from the optical disc at every time of loading the optical disc in the past. The medium information means information required for when recording or reproducing the optical disc, such as an optical disc type, a presence or absence of finalizing step, defect management information, etc., and also information used to be read out from the optical disc at every time of loading the optical disc in the past.

The memory 8 is connected with CPU 7 as an example, but it may be connected with inside or outside the data recording and reproducing apparatus 1, and may also be connected with inside the host computer. The memory 8 may further be replaced with a hard disc if information can be held, for example.

The servo circuit 9 controls the optical pickup 3 by a servo signal generated from the amplifier circuit 4.

An operation of the data recording and reproducing apparatus 1 will be described below when recording data in the optical disc 2. The CPU 7 acquires the setup information of the optical disc 2 via the optical pickup 3, amplifier circuit 4 and servo circuit 9 to store in the memory 8 when loading the optical disc 2 onto the data recording and reproducing apparatus 1. The CPU 7 also reads out the medium information from the optical disc 2 via the optical pickup 3, amplifier circuit 4 and signal processing circuit 5 to store in the memory 8. In addition, a processing for acquiring the setup information and medium information from the optical disc is generally referred to as a setup processing.

The host computer sends data to the data recording and reproducing apparatus 1 to receive it by the interface circuit 6. The signal processing circuit 5 applies the scramble to the data to then append the error-correcting code to it, apply the interleaving to it, modulate it, send it to the optical pickup 3, and record it in the optical disc 2.

An operation of the data recording and reproducing apparatus 1 will be described below when reproducing the data from the optical disc 2. The CPU 7 reads out the identification information of the optical disc 2 via the optical pickup 3, amplifier circuit 4 and signal processing circuit 5 when loading optical disc 2 onto the data recording and reproducing apparatus 1. The CPU 7 also reads out the corresponding setup information and medium information from the memory 8 to set them in the amplifier circuit 4 and servo circuit 9. The host computer requests data to the data recording and reproducing apparatus 1 to amplify a signal read out from the optical disc 2 via the optical pickup 3 by the amplifier circuit 4. The signal processing circuit 5 demodulates the data to release the interleaving, perform the error correction, release the scramble, and send the data to the host computer via the interface circuit 6.

Figure 2:
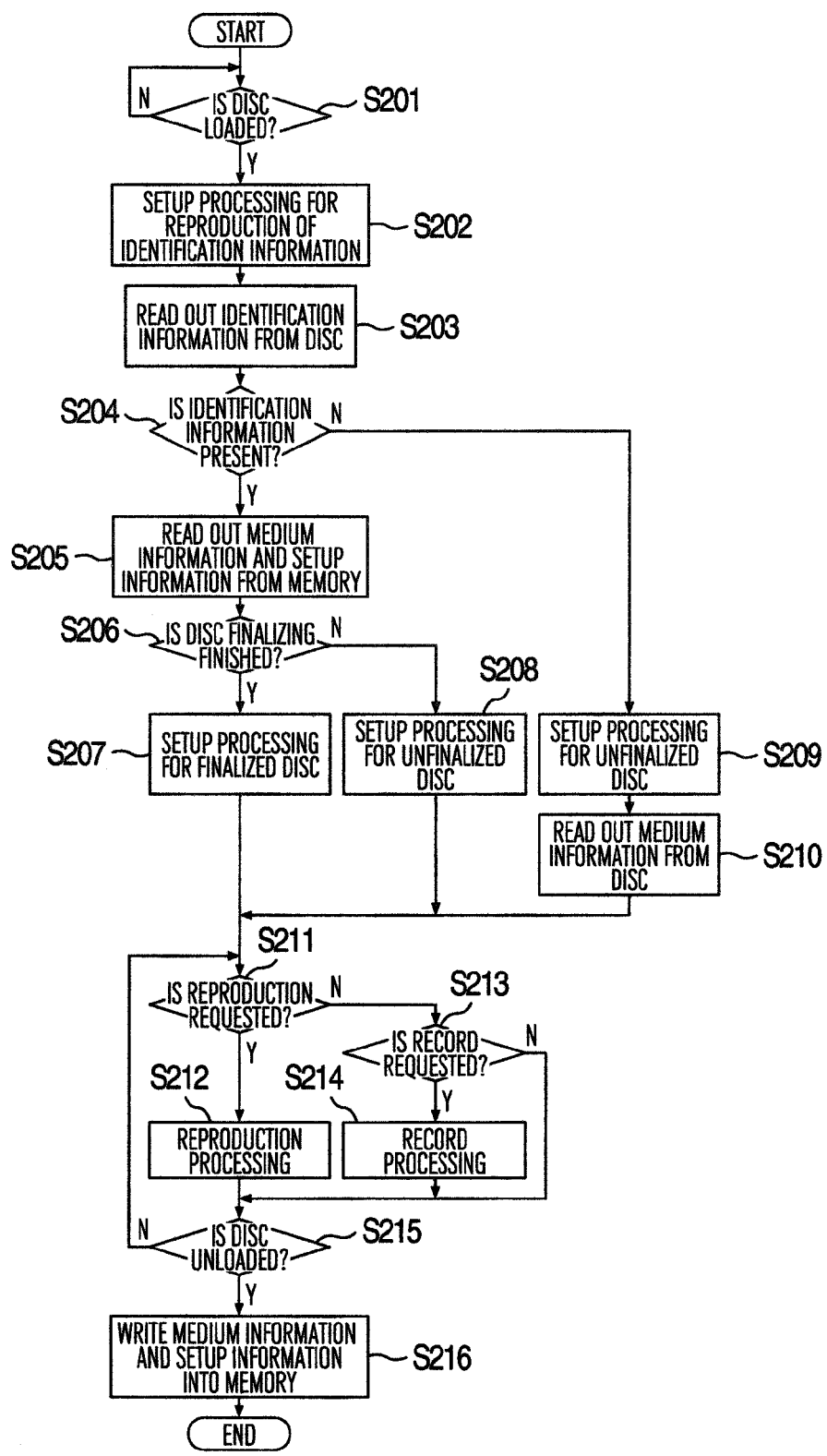
FIG. 2 is a flowchart for explaining the operation of the data recording and reproducing apparatus in the first embodiment.

FIG. 2 is a flowchart showing an operation of the data recording and reproducing apparatus 1 in the first embodiment. The optical disc 2 is loaded onto the data recording and reproducing apparatus 1 at a step S201. The setup processing for reproduction of the identification information is performed at a step S202. The identification information is read out from the optical disc 2 at a step S203.

If the medium information and setup information corresponding to the identification information are present in the memory 8 at a step S204, the medium information and setup information are read out from the memory 8 at a step S205.

The processing checks whether the optical disc 2 is finished finalizing by the medium information, at a step S206. If it is finished finalizing, a finalized disc setup processing is performed at a step S207. If it is not finished finalizing, an unfinalized disc setup processing is performed at a step S208.

The finalized means a processing for making BD-R as a recordable optical disc complete for an information structure as a reproducible optical disc. The finalized disc setup processing means a setup processing for performing an adjustment with use of the medium information and setup information read out from the memory 8 and for utilizing that the data is finished recording in the optical disc 2. The unfinalized disc setup processing means a setup processing for performing the adjustment with use of the medium information and setup information read out from the memory 8 and also the setup information for enabling even when the data is not recorded in the optical disc 2. In addition, whether the optical disc is finished finalizing was not clear as information in the past until the setup processing is finished.

Alternatively, the processing checks whether the optical disc 2 is finished finalizing by the medium information, at the step S206. If it is finished finalizing, a data reproduction setup processing is performed at the step S207. If it is not finished finalizing, a data record and reproduction setup processing is performed at the step S208.

The data record and reproduction setup processing means a setup processing for performing the adjustment with use of the medium information and setup information read out from the memory 8 and also performing the adjustment etc. required for the record and reproduction processing. The data reproduction setup processing means a setup processing for performing the adjustment with use of the medium information and setup information read out from the memory 8 and not performing the adjustment etc. required only for the record processing. The adjustment with use of the medium information and setup information read out from the memory 8 can be considered such that an optimum value is calculated by centering around the setup information, for example.

If the medium information corresponding to the identification information is not present in the memory 8 at the step S204, the unfinalized disc setup processing is performed at a step S209, and the medium information is read out from the optical disc 2 at a step S210.

Alternatively, if the medium information corresponding to the identification information is not present at the step S204, the data record and reproduction setup processing is performed at the step S209, and the medium information is read out from the optical disc 2 at the step S210.

If the host computer requests a data reproduction at a step S211, the data reproduction processing is performed at a step S212. Alternatively, if the host computer requests a data record at a step S213, the data record processing is performed at a step S214.

If the optical disc 2 is unloaded at a step S215, the medium information and setup information are written into the memory 8 together with the identification information, at a step S216, and the processing then terminates.

FIG. 3 is a table showing the identification information, medium information and setup information to be stored in the memory 8 in the data recording and reproducing apparatus 1 in the first embodiment. That is, the medium information read out from the optical disc 2 and setup information acquired from the optical disc 2 are recorded in the memory 8 together with the identification information in advance, and the medium information and setup information corresponding to the identification information are read out from the memory 8 when the optical disc 2 is loaded onto the data recording and reproducing apparatus 1.

In the configuration of the first embodiment described above, the medium information and setup information of the optical disc 2 are recorded in the memory 8 in advance. The medium information corresponding to the optical disc 2 is read out from the memory 8 when loading the optical disc 2. The setup processing is then switched by whether the optical disc 2 is finished finalizing. In this way, the time period of the setup processing for the optical disc 2 can be shortened. The time period of the setup processing for the optical disc 2 can also be shortened by causing the medium information read out from the memory 8.

Various adjustment processes etc. used to be performed at every time of loading the optical disc in the past can further be reduced by causing the setup information read out from the memory 8, so that the time period of the setup processing for the optical disc 2 can be shortened.

Embodiment 2

Figure 4:
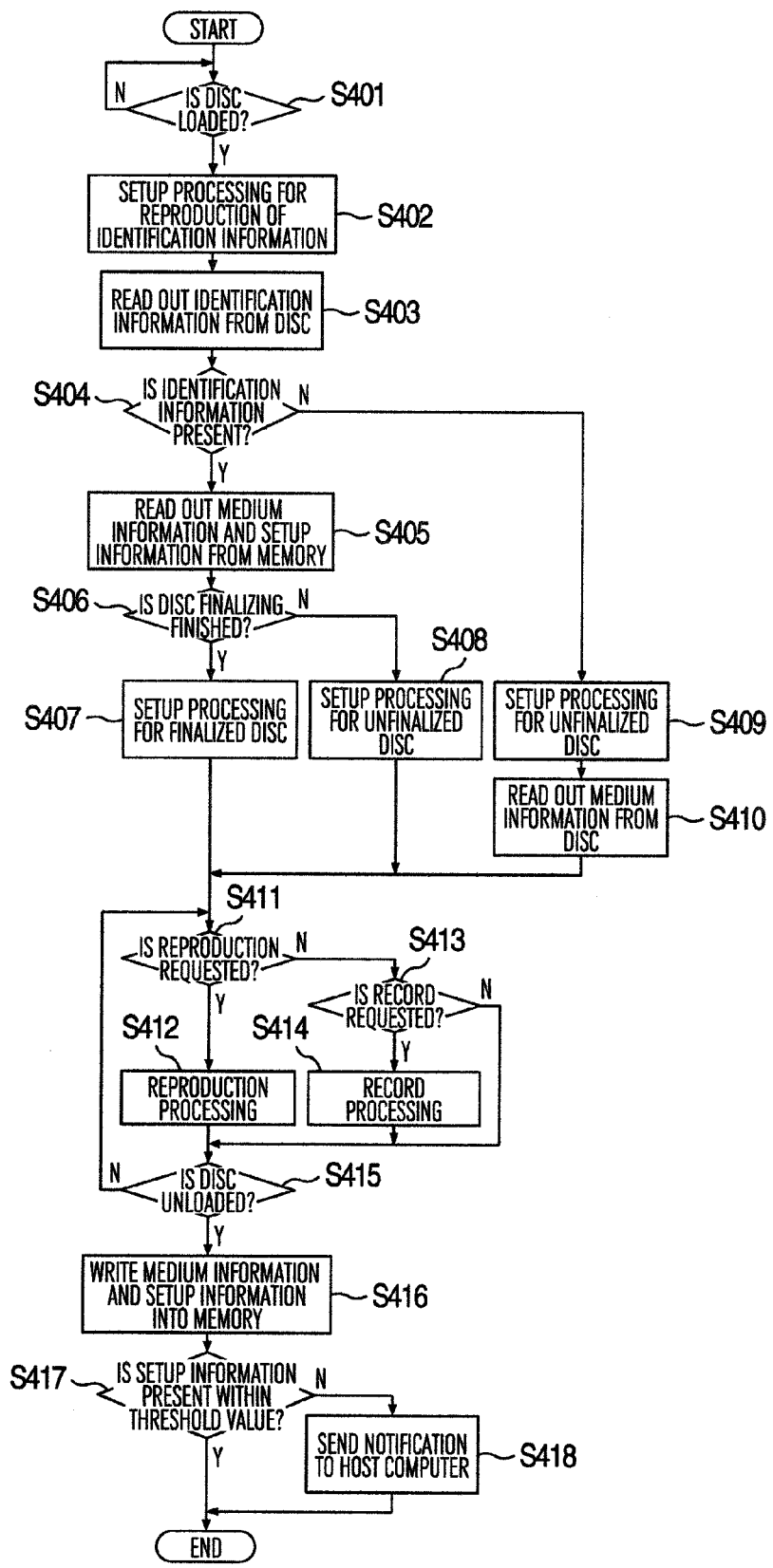
FIG. 4 is a flowchart for explaining the operation of the data recording and reproducing apparatus in a second embodiment.

FIG. 4 is a flowchart showing an operation of the data recording and reproducing apparatus 1 in a second embodiment of the invention. The optical disc 2 is loaded onto the data recording and reproducing apparatus 1 at a step S401. The setup processing is performed for the reproduction of the identification information at a step S402. The identification information is read out from the optical disc 2 at a step S403. If the medium information and setup information corresponding to the identification information are present in the memory 8 at a step S404, the medium information and setup information are read out from the memory 8 at a step S405.

The processing checks whether the optical disc 2 is finished finalizing by the medium information at a step S406. If it is finished finalizing, the finalized disc setup processing is performed at a step S407. If it is not finished finalizing, the unfinalized disc setup processing is performed at a step S408.

Alternatively, the processing checks whether the optical disc 2 is finished finalizing by the medium information at the step S406. If it is finished finalizing, the data reproduction setup processing is performed at the step S407. If it is not finished finalizing, the data record and reproduction setup processing is performed at the step S408.

If the medium information and setup information corresponding to the identification information are not present at the step S404, the unfinalized disc setup processing is performed at a step S409. The medium information is then read out from the optical disc 2 at a step S410.

The host computer requests the data reproduction at a step S411 to perform the data reproduction processing at a step S412. Alternatively, the host computer requests the data record at a step S413 to perform the data record processing at a step S414.

If the optical disc 2 is unloaded at a step S415, the medium information and setup information are written into the memory 8 together with the identification information at a step S416. The processing checks whether the setup information is present within a previously set threshold value at a step S417. If it is present within the threshold value, the processing terminates. If it is not present within the threshold value, a notification is sent to the host computer at a step S418. The processing then terminates.

FIG. 5 is a table showing the identification information, medium information and setup information to be stored in the memory 8 in the data recording and reproducing apparatus 1 in the second embodiment. That is, the medium information read out from the optical disc 2 and setup information also acquired from the optical disc 2 are recorded in the memory 8 together with the identification information in advance. The medium information and setup information corresponding to the identification information are then read out from the memory 8 when the optical disc 2 is loaded onto the data recording and reproducing apparatus 1. For example, assuming that the previously set threshold value is "50h" in respective adjustment values, the disc type BD-RE corresponding to the product number "187h" and serial number "00001987" exceeds the threshold value. Therefore, the notification is sent to the host computer.

In the configuration of the second embodiment described above, the medium information and setup information of the optical disc 2 are recorded in the memory 8 in advance. The medium information corresponding to the optical disc 2 is read out from the memory 8 when loading the optical disc 2. The setup processing is then switched by whether the optical disc 2 is finished finalizing. In this way, the time period of the setup processing for the optical disc 2 can be shortened. The time period of the setup processing for the optical disc 2 can also be shortened by causing the medium information read out from the memory 8.

The various adjustment processes etc. used to be performed at every time of loading the optical disc in the past can further be reduced by causing the setup information read out from the memory 8, so that the time period of the setup processing for the optical disc 2 can be shortened.

The processing checks whether the setup information is present within the previously set threshold value and the notification is sent to the host computer, so that the host computer can predict a failure of the data recording and reproducing apparatus 1.

Embodiment 3

Figure 6:
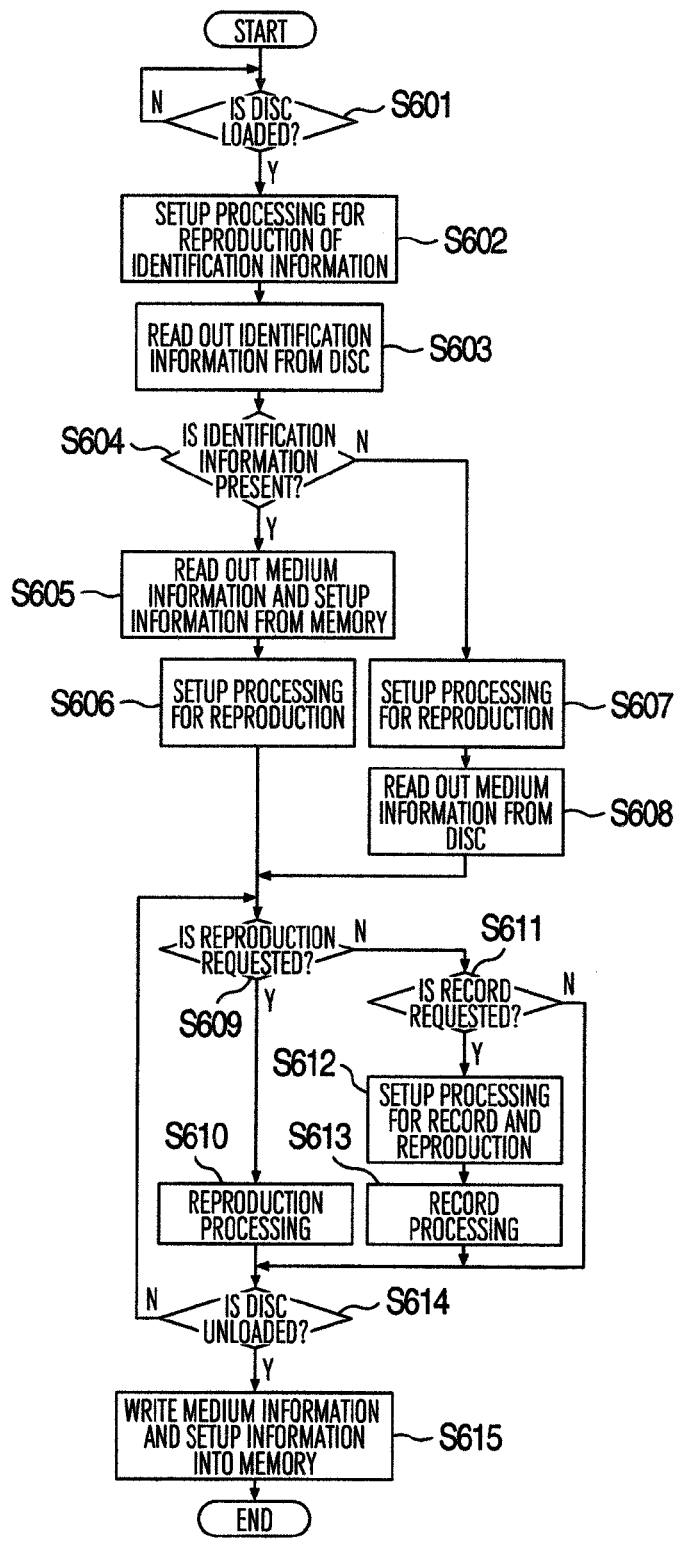
FIG. 6 is a flowchart for explaining the operation of the data recording and reproducing apparatus in a third embodiment.

FIG. 6 is a flowchart showing an operation of the data recording and reproducing apparatus 1 in a third embodiment of the invention. The optical disc 2 is loaded onto the data recording and reproducing apparatus 1 at a step S601. The setup processing is performed for the reproduction of the identification information at a step S602. The identification information is read out from the optical disc 2 at a step S603. If the medium information and setup information corresponding to the identification information are present in the memory 8 at a step S604, the medium information and setup information are read out from the memory 8 at a step S605. The data reproduction setup processing is then performed at a step S606.

If the medium information and setup information corresponding to the identification information are not present in the memory 8 at the step S604, the data reproduction setup processing is performed at a step S607 and the medium information is read out from the optical disc 2 at a step S608. In addition, the data reproduction setup processing at the step S607 has no information to be read out from the memory 8, therefore, the processing time period of that at the step S607 becomes longer than the data reproduction setup processing at the step S606.

The host computer requests the data reproduction at a step S609 to perform the data reproduction processing at a step S610.

The host computer requests the data record at a step S611 to perform the data record and reproduction setup processing at a step S612, and the data record processing is then performed at a step S613.

If the optical disc 2 is unloaded at a step S614, the medium information and setup information are written into the memory 8 together with the identification information at a step S615. The processing then terminates.

In the configuration of the third embodiment described above, the medium information and setup information of the optical disc 2 are recorded in the memory 8 in advance. The medium information corresponding to the optical disc 2 is read out from the memory 8 when loading the optical disc 2, and the data reproduction setup processing is then performed. The data reproduction setup processing does not perform for a processing required only for the data record, therefore, the time period of that processing is generally short, compared with that of the data record and reproduction setup processing. This embodiment describes the processing of prioritizing the data reproduction setup, regardless of whether the optical disc 2 is finished finalizing, therefore, the time period of the setup processing for the unfinalized disc can be shortened, compared with that of the first embodiment.

The time period of the setup processing for optical disc 2 can also be shortened by causing the medium information read out from the memory 8.

The various adjustment processes etc. used to be performed at every time of loading the optical disc in the past can be reduced by causing the setup information read out from the memory 8, so that the time period of the setup processing for the optical disc 2 can be shortened.

Embodiment 4

Figure 7:
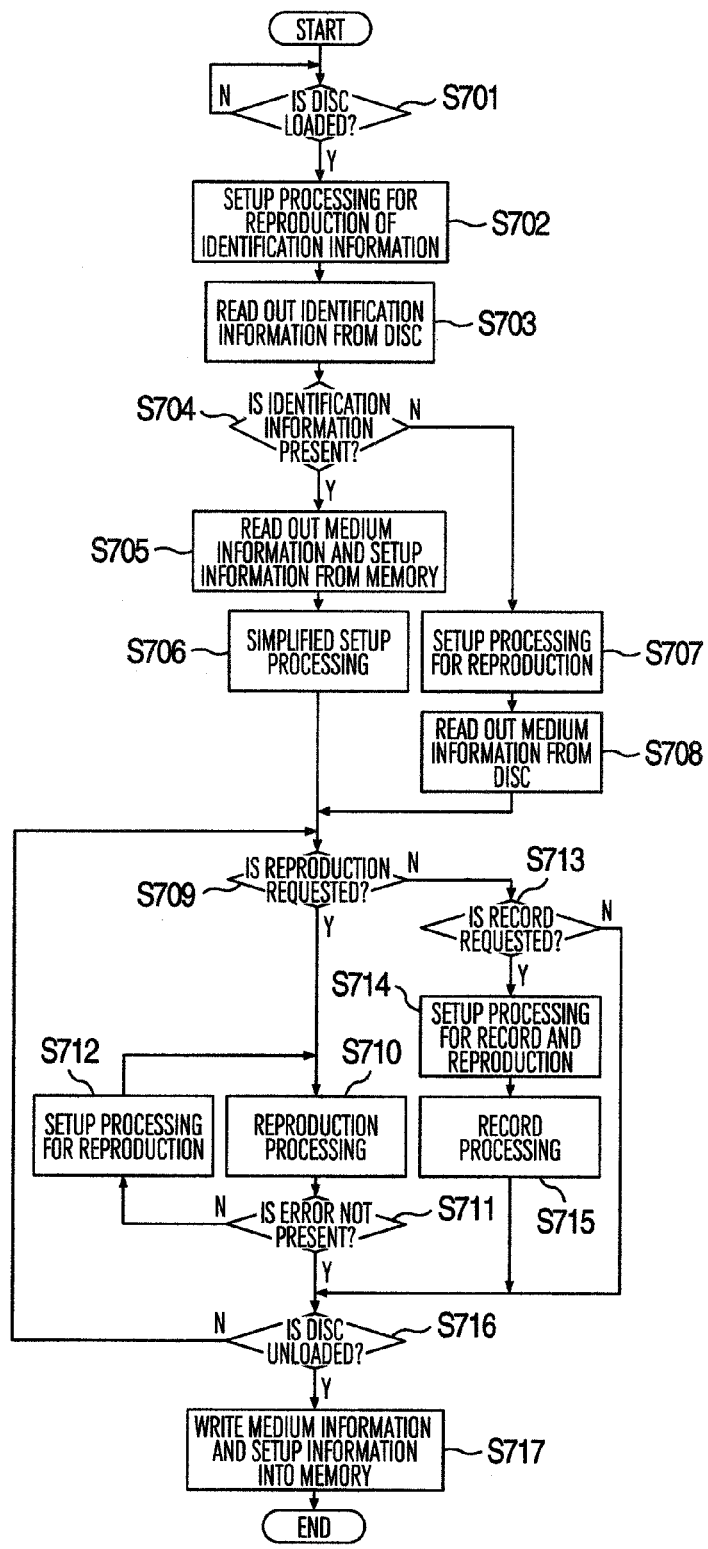
FIG. 7 is a flowchart for explaining the operation of the data recording and reproducing apparatus in a fourth embodiment.

FIG. 7 is a flowchart showing an operation of the data recording and reproducing apparatus 1 in a fourth embodiment of the invention. The optical disc 2 is loaded onto the data recording and reproducing apparatus 1 at a step S601. The setup processing is performed for the reproduction of the identification information at a step S702. The identification information is read out from the optical disc 2 at a step S703.

If the medium information corresponding to the identification information is present in the memory 8 at a step S704, the medium information is read out from the memory 8 at a step S705. A simplified setup processing is then performed at a step S706. The simplified setup processing means that the setup information read out from the memory 8 at the step S705 is used without change, alternatively, the optimum value of a tilt adjustment for BD-R is only acquired, etc. The tilt adjustment means like a learning control in such that a relative angle between an objective lens in the optical pickup 3 and the optical disc 2 is maintained in an appropriate condition. This is because the adjustment is generally required at every time of loading the optical disc.

If the medium information corresponding to the identification information is not present in the memory 8 at the step S704, the data reproduction setup processing is performed at a step S707. The medium information is then read out from the optical disc 2 at a step S708.

The host computer requests the data reproduction at a step S709 to perform the data reproduction processing at a step S710. If a data error occurs at a step S711, the data reproduction setup processing is performed at a step S712.

The host computer requests the data record at a step S713 to perform the data record and reproduction setup processing at a step S714. The data record processing is performed at a step S715.

If the optical disc 2 is unloaded at a step S716, the medium information and setup information are written into the memory 8 together with the identification information at a step S717. The processing then terminates. In the configuration of the fourth embodiment described above, the medium information and setup information of the optical disc 2 are recorded in the memory 8 in advance. The medium information and setup information corresponding to the optical disc 2 are read out from the memory 8 when loading the optical disc 2, and the simplified setup processing is then performed.

In the reproduction processing, a detailed setup processing is performed only for when the data error occurs. Therefore, the data reproduction setup processing is simplified more than that of the third embodiment, so that the time period of setup processing for optical disc 2 can be shortened.

Embodiment 5

Figure 8:
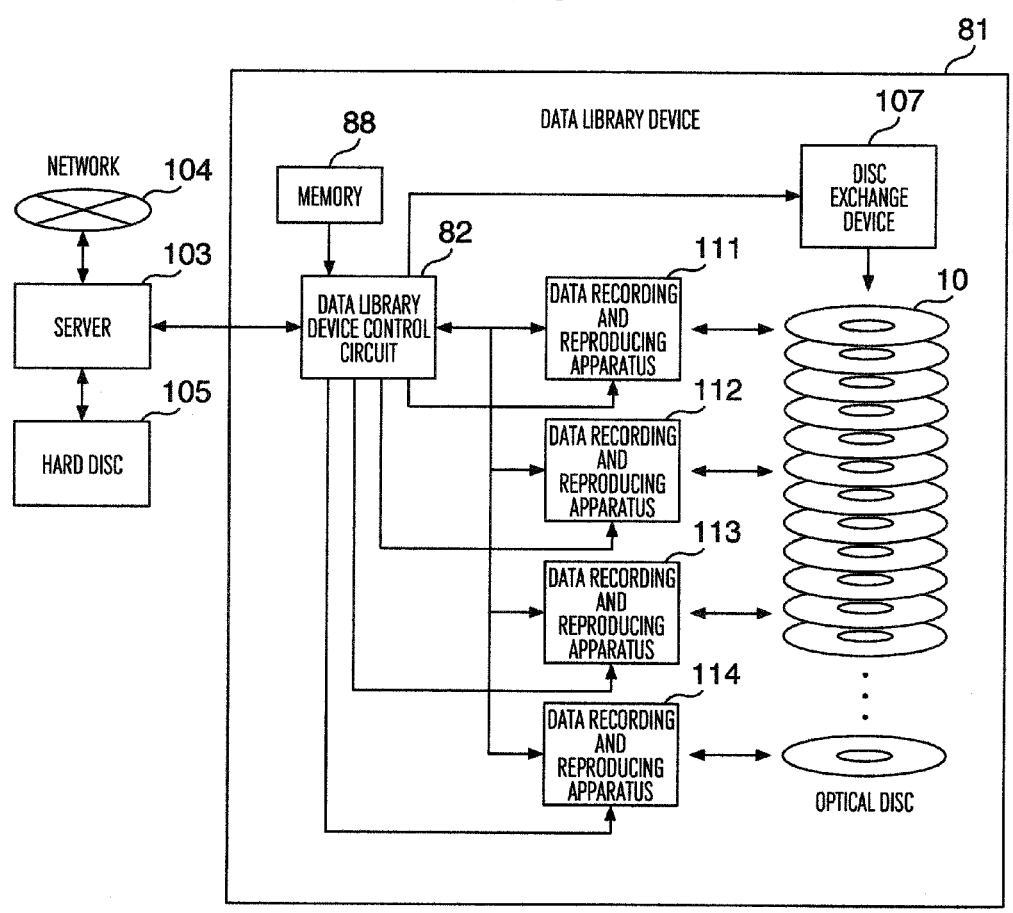
FIG. 8 is a block diagram showing the configuration of the data library device in a fifth embodiment.

FIG. 8 is a block diagram showing a configuration of a data library device in a fifth embodiment of the invention. A reference numeral 81 denotes a data library device for recording data accumulated in a hard disc 105, sent from a network 104 via a server 103, in optical discs 10, or the data is reproduced from the optical discs 10 to be sent to the network 104 via the server 103. The server 103 controls the hard disc 105 and the data library device 81 to manage the data sent from the network 104. The hard disc 105 is controlled by the server 103 to be subjected to the record and reproduction of the data sent from the network 104.

The plural optical discs 10 are incorporated in the data library device 81. The optical discs 10 are selected by an optical disc exchange device 107 to be loaded onto data recording and reproducing apparatuses 111, 112, 113, 114 and record or reproduce the data. The data recording and reproducing apparatuses 111, 112, 113, 114 are controlled by a library device control circuit 82 to record or reproduce the data for the optical discs 10. The disc exchange device 107 is controlled by the library device control circuit 82 to exchange the optical disc 10 to be loaded onto the data recording and reproducing apparatus 111, 112, 113, 114.

The library device control circuit 82 controls the optical disc exchange device 107 in response to a request from the server 103 to select a desirable optical disc 10 from among the optical discs 10 and send to the data recording and reproducing apparatus 111, 112, 113, 114.

A reference numeral 88 denotes a memory for recording the medium information and setup information sent from the data recording and reproducing apparatus 111, 112, 113, 114 via the library device control circuit 82. The library device control circuit 82 controls to reproduce the medium information and setup information to send to the data recording and reproducing apparatus 111, 112, 113, 114.

Figure 11:
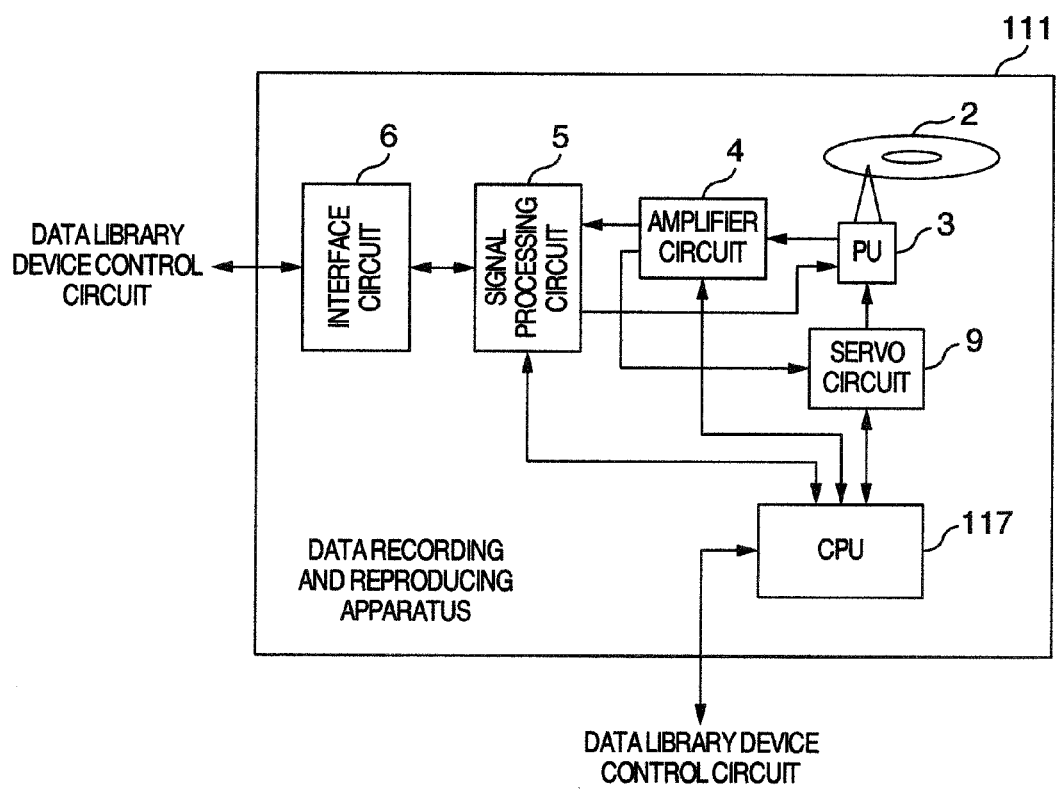
FIG. 11 is a block diagram showing the configuration of the data recording and reproducing apparatus in the fifth embodiment.

FIG. 11 is a block diagram showing a configuration of the data recording and reproducing apparatus 111 in the fifth embodiment. A description for elements in FIG. 11 is omitted for those designating the same reference numerals in FIG. 1. The data recording and reproducing apparatus 111 records data received from the library device control circuit 82 in the optical disc 10, and also supplies reproduced data from the optical disc 10 to the library device control circuit 82. A reference numeral 117 denotes CPU for controlling the record processing and reproduction processing of the data recording and reproducing apparatus 111. The CPU 117 also receives the medium information and setup information from the memory 88 via the library device control circuit 82 when loading the optical disc 10, and supplies the medium information and setup information to the memory 88 via library device control circuit 82 when unloading the optical disc 10. In addition, the data recording and reproducing apparatus 111 has been described above, but a description for the data recording and reproducing apparatuses 112, 113, 114 is also the same as above.

Figure 9:
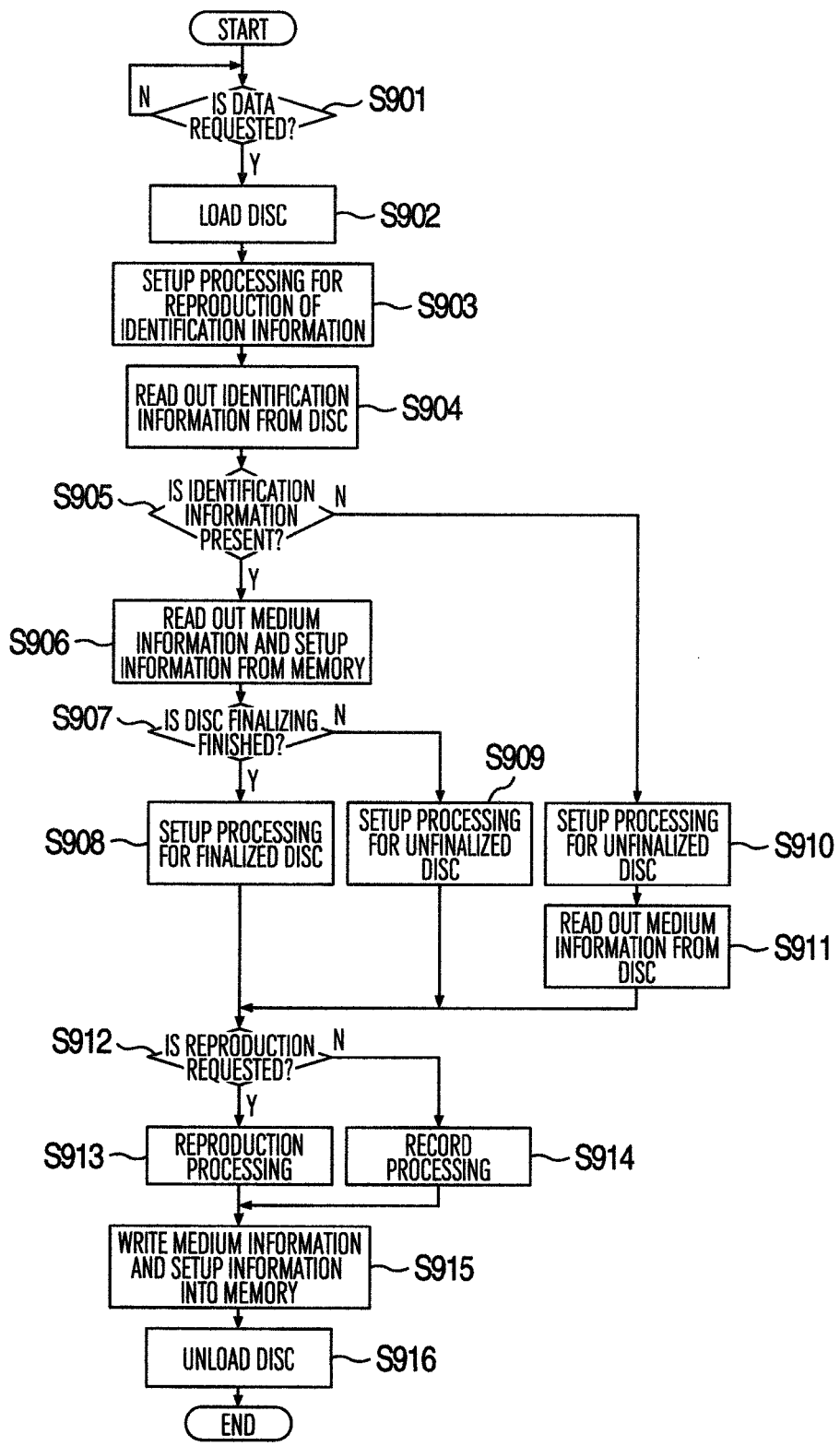
FIG. 9 is a flowchart for explaining the operation of the data library device in the fifth embodiment.

FIG. 9 is a flowchart showing an operation of the data library device 81 in the fifth embodiment. If the data library device 81 has a data reproduction request or data record request at a step S901, a corresponding optical disc 10 is loaded onto the data recording and reproducing apparatus 111, 112, 113, 114 at a step S902.

The setup processing for the reproduction of the identification information is performed at a step S903, and the identification information is read out from the optical disc 10 at a step S904.

If the medium information and setup information corresponding to the identification information are present in the memory 88 at a step S905, the medium information and setup information are read out from the memory 88 at a step S906.

The processing then checks whether the optical disc 10 is finished finalizing by the medium information at a step S907. If it is finished finalizing, the finalized disc setup processing is performed at a step S908. If it is not finished finalizing, the unfinalized disc setup processing is performed at a step S909.

Alternatively, the processing checks whether the optical disc 10 is finished finalizing by the medium information at the step S907. If it is finished finalizing, the data reproduction setup processing is performed at the step S908. If it is not finished finalizing, the data record and reproduction setup processing is performed at the step S909.

If the medium information and setup information corresponding to the identification information are not present in the memory 88 at the step S905, the unfinalized disc setup processing is performed at a step S910, and the medium information is read out from the optical disc 10 at a step S911.

Alternatively, if the medium information and setup information corresponding to the identification information are not present in the memory 88 at the step S905, the data record and reproduction setup processing is performed at the step S910, and the medium information is read out from the optical disc 10 at a step S911.

The processing then checks whether the data request from the host computer is for the data reproduction at a step S912. If it is data reproduction request, the data reproduction processing is performed at a step S913. If it is data record request, the data record processing is performed at a step S914.

The medium information and setup information are written into the memory 88 together with the identification information at a step S915, and the optical disc 10 is unloaded at a step S916 to then terminate the processing.

In the configuration of the fifth embodiment described above, the medium information and setup information of the optical disc 10 are recorded in the memory 88 in advance. The medium information corresponding to the optical disc 10 is read out from the memory 88 when loading the optical disc 10. The setup processing is then switched by whether the optical disc 10 is finished finalizing. In this way, the time period of the setup processing for the optical disc 10 can be shortened, and the time period of the setup processing for the optical disc 10 can also be shortened by causing the medium information read out from the memory 88.

The various adjustment processes etc. used to be performed at every time of loading the optical disc in the past can be reduced by causing the setup information read out from the memory 88, so that the time period of the setup processing for optical disc 10 can be shortened.

Embodiment 6

Figure 10:
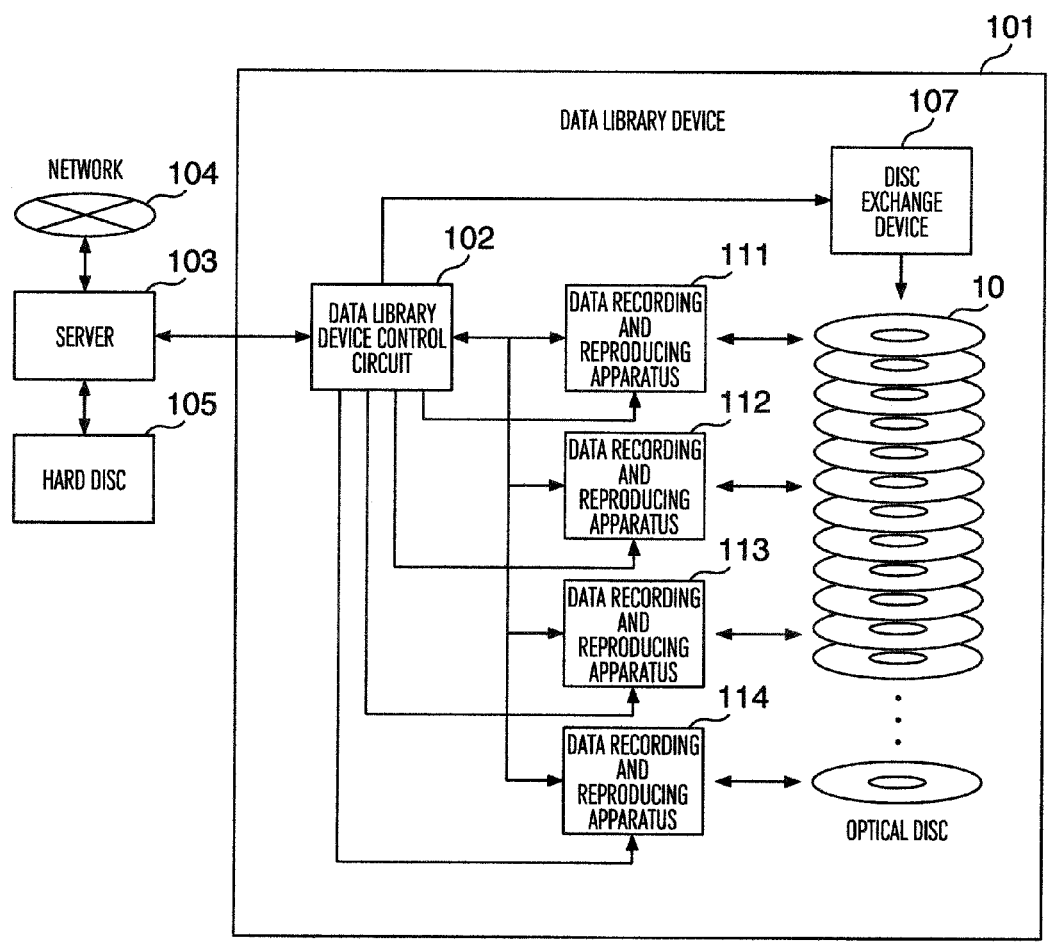
FIG. 10 is a block diagram showing the configuration of the data library device in a sixth embodiment.

FIG. 10 is a block diagram showing a configuration of a data library device in a sixth embodiment. A reference numeral 101 denotes a data library device for recording data, sent from the network 104 via the server 103, accumulated in the hard disc 105, in the optical discs 10, or the data is reproduced from the optical discs 10 to be sent to the network 104 via the server 103. The server 103 controls the hard disc 105 and the data library device 101 to manage the data sent from the network 104. The hard disc 105 is controlled by the server 103 to be subjected to the record and reproduction of the data sent from the network 104, and also records the setup information and medium information sent from the data recording and reproducing apparatus 111, 112, 113, 114 via the server 103 and a library device control circuit 102. The library device control circuit 102 reproduces the setup information and medium information to send to the data recording and reproducing apparatus 111, 112, 113, 114.

The plural optical discs 10 are incorporated in the data library device 101. The optical discs 10 are selected by the optical disc exchange device 107 to be loaded onto the data recording and reproducing apparatus 111, 112, 113, 114 and record or reproduce the data. The data recording and reproducing apparatuses 111, 112, 113, 114 are controlled by the library device control circuit 102 to record or reproduce the data for the optical discs 10. The disc exchange device 107 is controlled by the library device control circuit 102 to exchange the optical disc 10 to be loaded onto the data recording and reproducing apparatus 111, 112, 113, 114.

The library device control circuit 102 controls the optical disc exchange device 107 in response to a request from the server 103 to select a desirable optical disc 10 from among the optical discs 10 and send to the data recording and reproducing apparatus 111, 112, 113, 114.

In addition, the above example has been described such that the medium information and setup information are sent directly to CPU 117 (FIG. 11) in the data recording and reproducing apparatus 111 from the library device control circuit 102, but these information may be sent via the interface circuit 6 as the same as normally sent record and reproduction data.

The above description has been adopted to the data recording and reproducing apparatus 111, but a description for the data recording and reproducing apparatuses 112, 113, 114 is also the same as above.

Figure 12:
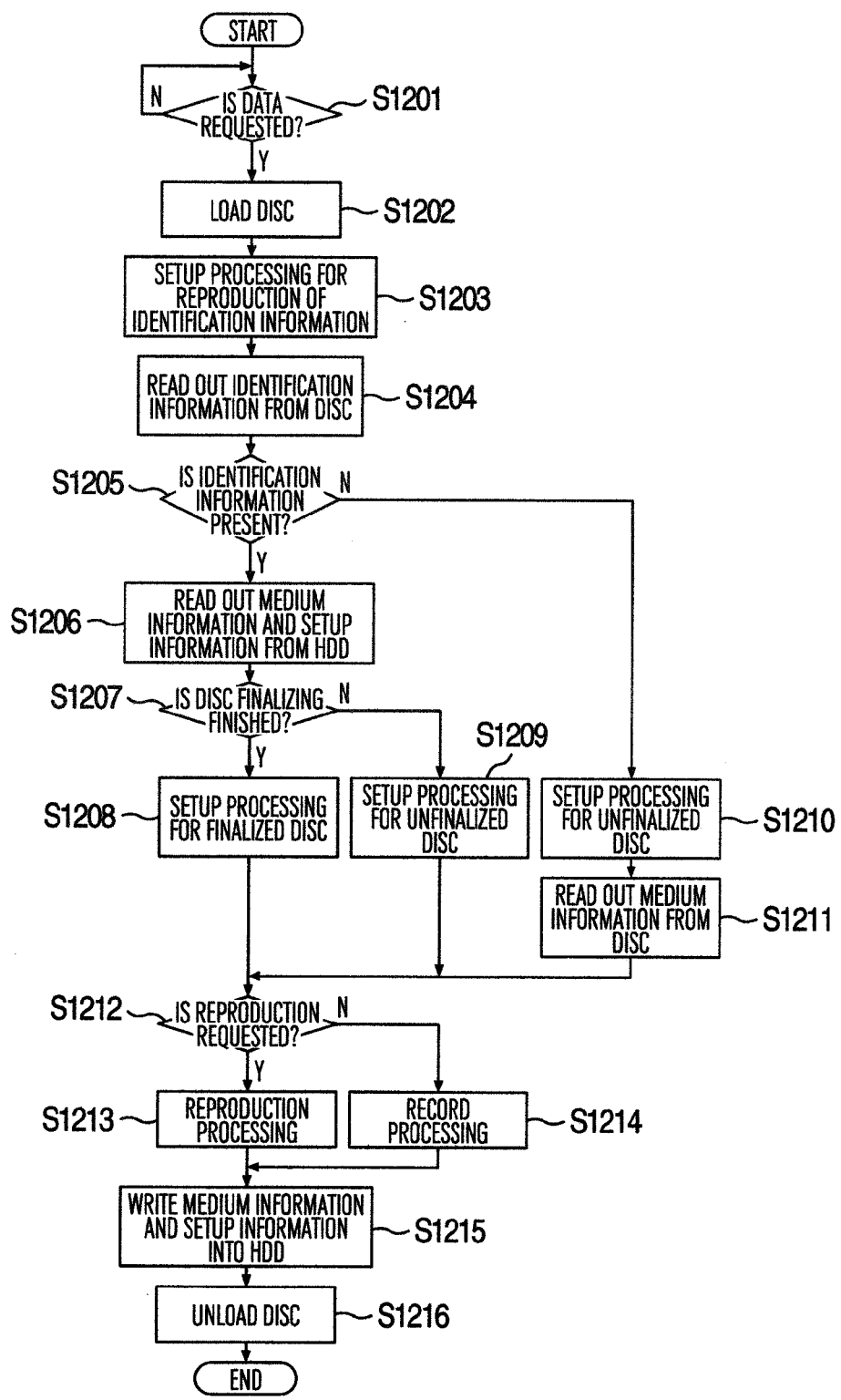
FIG. 12 is a flowchart for explaining the operation of the data library device in a sixth embodiment.

FIG. 12 is a flowchart showing an operation of the data library device 101 in the sixth embodiment. If the data library device 101 has the data reproduction request or data record request at a step S1201, the corresponding optical disc 10 is loaded onto the data recording and reproducing apparatus 111, 112, 113, 114 at a step S1202.

The setup processing for the reproduction of the identification information is performed at a step S1203, and the identification information is read out from the optical disc 10 at a step S1204.

If the medium information and setup information corresponding to the identification information are present in the hard disc 105 at a step S1205, the medium information and setup information are read out from the hard disc 105 at a step S1206.

The processing then checks whether the optical disc 10 is finished finalizing by the medium information at a step S1207. If it is finished finalizing, the finalized disc setup processing is performed at a step S1208. If it is not finished finalizing, the unfinalized disc setup processing is performed at a step S1209.

Alternatively, the processing checks whether the optical disc 10 is finished finalizing by the medium information at the step S1207. If it is finished finalizing, the data reproduction setup processing is performed at the step S1208. If it is not finished finalizing, the data record and reproduction setup processing is performed at the step S1209.

If the medium information corresponding to the identification information is not present in the hard disc 105 at the step S1205, the unfinalized disc setup processing is performed at a step S1210, and the medium information is read out from the optical disc 10 at a step S1211.

Alternatively, if the medium information corresponding to the identification information is not present in the hard disc 105 at the step S1205, the data record and reproduction setup processing is performed at the step S1210, and the medium information is read out from the optical disc 10 at a step S1211.

The processing then checks whether the data request from the host computer is for the data reproduction at a step S1212. If it is the data reproduction request, the data reproduction processing is performed at a step S1213. If it is the data record request, the data record processing is performed at a step S1214.

The medium information and setup information are written into the hard disc 105 together with the identification information at a step S1215, and the optical disc 10 is unloaded at a step S1216 to then terminate the processing.

In addition, this embodiment has been described as an example of the case where the medium information and setup information, written into the hard disc 105, of the respective optical discs 10 are specified by the identification information of the respective optical discs 10. In a data library device, a file system of respective optical discs is generally stored in the hard disc, therefore, the medium information and setup information may be specified in correspondence to this file system.

In the configuration of the sixth embodiment described above, the medium information of the optical disc 10 and setup information are recorded in the hard disc 105 in advance. The medium information corresponding to the optical disc 10 is read out from the hard disc 105 when loading the optical disc 10. The setup processing is then switched by whether the optical disc 10 is finished finalizing. In this way, the time period of the setup processing for optical disc 10 can be shortened. The various adjustment processes etc. used to be performed at every time of loading the optical disc in the past can be reduced by causing the setup information read out from the hard disc 105, so that the time period of the setup processing for optical disc 10 can be shortened.

The memory capacity of the data library device 101 can also be reduced, compared with that of the fifth embodiment.

Embodiment 7

Figure 13:
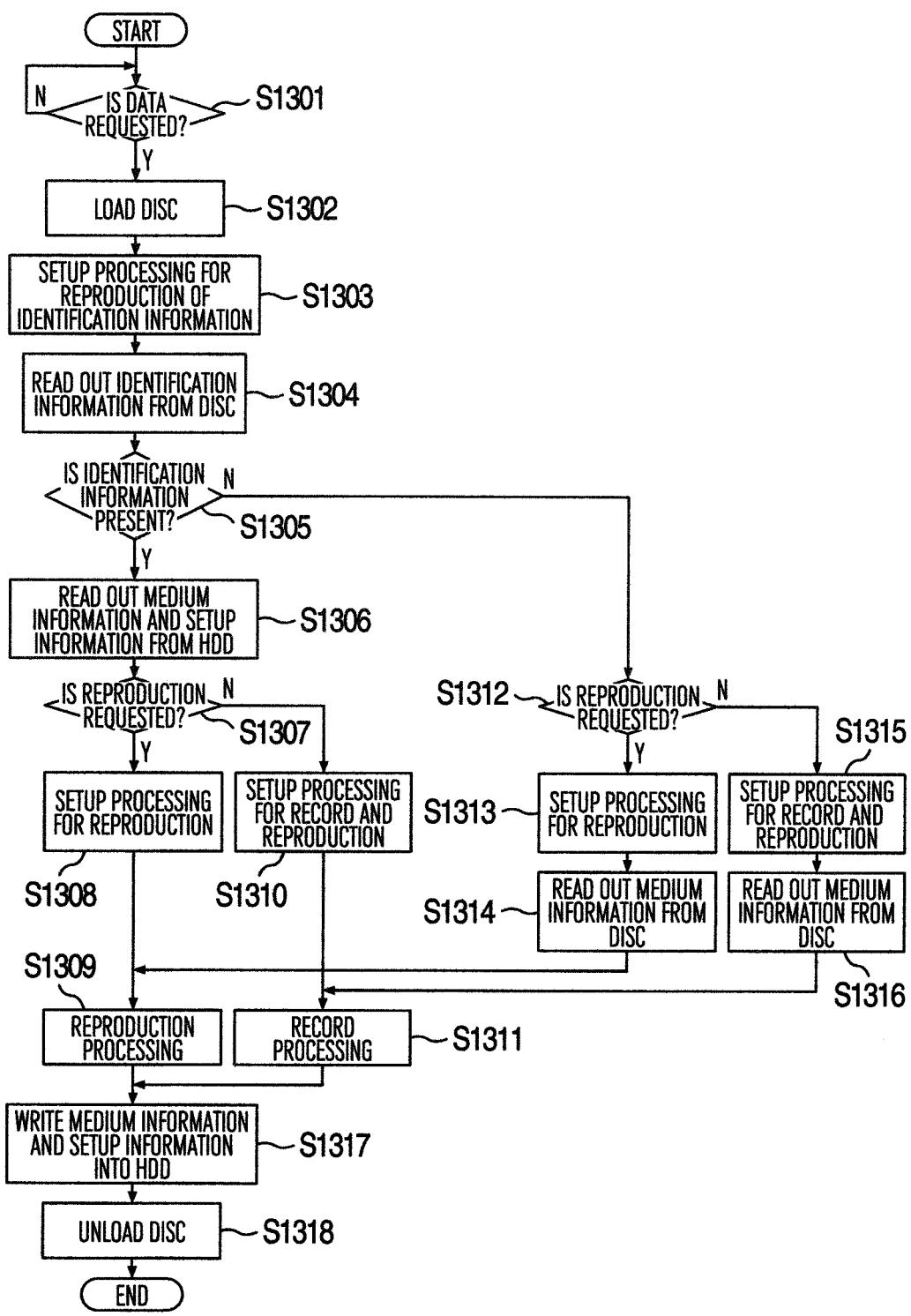
FIG. 13 is a flowchart for explaining the operation of the data library device in a seventh embodiment.

FIG. 13 is a flowchart showing an operation of the data library device 101 in a seventh embodiment. If the data library device 101 has the data reproduction request or data record request at a step S1301, the optical disc 10 is loaded onto the data recording and reproducing apparatus 111, 112, 113, 114 at a step S1302.

The setup processing for the reproduction of the identification information is performed at a step S1303, and the identification information is read out from the optical disc 10 at a step S1304.

If the medium information and setup information corresponding to the identification information are present in the hard disc 105 at a step S1305, the medium information and setup information are read out from the hard disc 105 at a step S1306.

The processing then checks whether the data request from the host computer is for the data reproduction at a step S1307. If it is the data reproduction request, the data reproduction setup processing is performed at a step S1308, and the data reproduction processing is performed at a step S1309. If it is the data record request, the data record and reproduction setup processing is performed at a step S1310, and the data record processing is performed at a step S1311.

If the medium information and setup information corresponding to the identification information are not present in the hard disc 105 at the step S1305, the processing checks whether the data request from the host computer is for the data reproduction at a step S1312. If it is the data reproduction request, the data reproduction setup processing is performed at a step S1313. The medium information is then read out from the optical disc 10 at a step S1314, and the data reproduction processing is performed at the step S1309. If it is the data record request, the data record and reproduction setup processing is performed at a step S1315. The medium information is read out from the optical disc 10 at a step S1316, and the data record processing is performed at the step S1311.

The medium information and setup information are written into the hard disc 10 together with the identification information at a step S1317. The optical disc 10 is unloaded at a step S1318 to then terminate the processing.

In addition, this embodiment has been described as an example of the case where the medium information and setup information, written into the hard disc 105, of the respective optical discs 10 are specified by the identification information of the respective optical discs 10. In the data library device, the file system of respective optical discs is generally stored in the hard disc, therefore, the medium information and setup information may be specified in correspondence to this file system.

In the configuration of the seventh embodiment described above, the medium information and setup information of the optical disc 10 are recorded in the hard disc 105 in advance. The setup processing is then switched by whether the data request from the server 103 is for the data reproduction request or data record request, so that the time period of the setup processing for optical disc 10 can be shortened in the data reproduction request. The time period of the setup processing for optical disc 10 can also be shortened by causing the medium information read out from the hard disc 105.

The various adjustment processes etc. used to be performed at every time of loading the optical disc in the past can be reduced by causing the setup information read out from the hard disc 105, so that the time period of the setup processing for optical disc 10 can be shortened.

Embodiment 8

Figure 14:
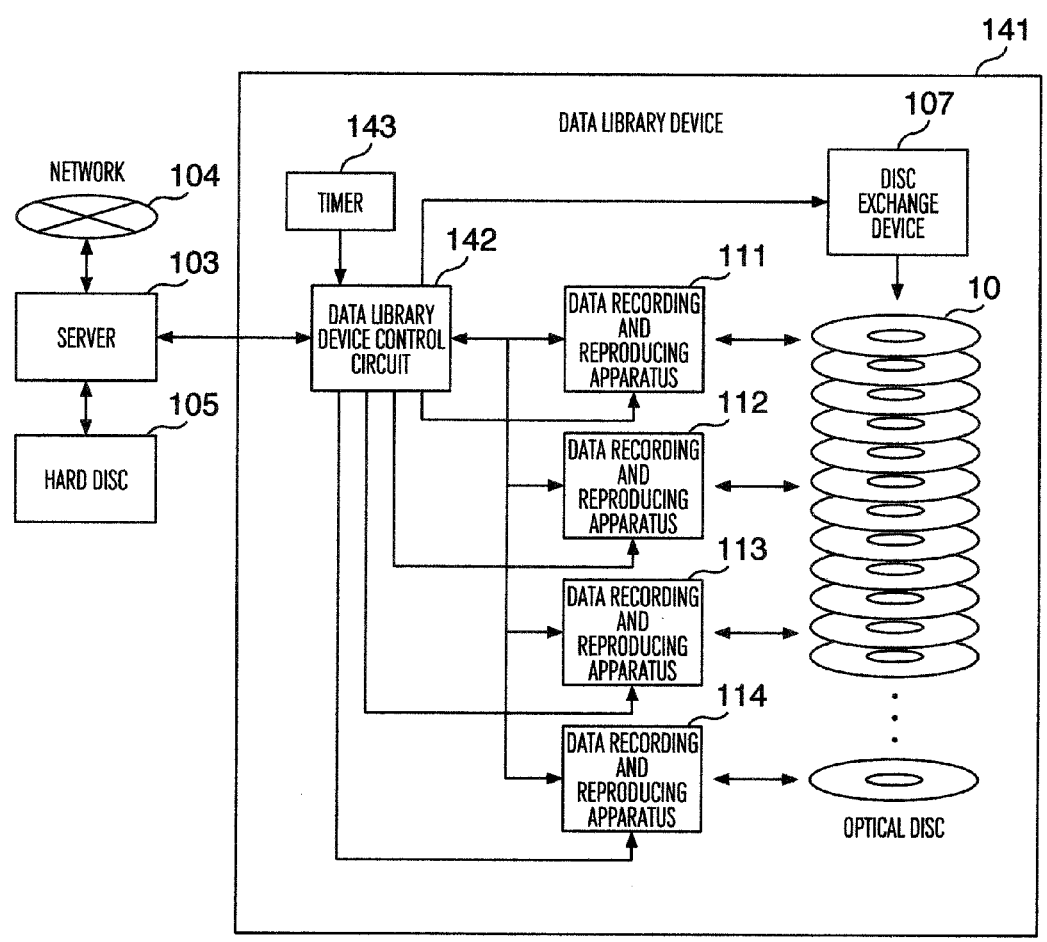
FIG. 14 is a block diagram showing the configuration of the data library device in an eighth embodiment.

FIG. 14 is a block diagram showing a configuration of a data library device 141 in an eighth embodiment. A description is omitted for elements in FIG. 14 designating the same reference numerals as those in FIG. 10. A reference numeral 141 denotes a data library device for recording data accumulated in the hard disc 105, sent from a network 104 via the server 103, in the optical discs 10, or the data is reproduced from the optical disc 10 to be sent to the network 104 or hard disc 105 via the server 103. The server 103 controls the hard disc 105 and the data library device 141 to manage the data sent from the network 104.

The plural optical discs 10 are incorporated in the data library device 141. The optical discs 10 are selected by the optical disc exchange device 107 to be loaded onto the data recording and reproducing apparatus 111, 112, 113, 114 and record or reproduce the data. The data recording and reproducing apparatuses 111, 112, 113, 114 are controlled by a library device control circuit 142 to record or reproduce the data for the optical disc 10. The disc exchange device 107 is controlled by the library device control circuit 142 to exchange the optical disc 10 to be loaded onto the data recording and reproducing apparatus 111, 112, 113, 114.

The library device control circuit 142 controls the optical disc exchange device 107 in response to a request from the server 103 to select a desirable optical disc 10 from among the optical discs 10, control the data recording and reproducing apparatus 111, 112, 113, 114, and record or reproduce the data for the optical disc 10. The library device control circuit 142 also instructs a switching of control programs to the data recording and reproducing apparatus 111, 112, 113, 114 on the basis of time information supplied from a timer 143.

The timer 143 supplies the time information to the library device control circuit 142. For example, two times 8:00 and 22:00 are set in the timer 143. The time period 8:00 to 22:00 is set as a reproduction priority time slot, and the time period 22:00 to 8:00 is set as a record priority time slot. In this way, the processing is switched. The library device control circuit 142 assigns the time period 8:00 to 22:00 to a data reproduction program and the time period 22:00 to 8:00 to a data record and reproduction program in the data recording and reproducing apparatus 111, 112, 113, 114 on the basis of the time information supplied from the timer 143.

Figure 15:
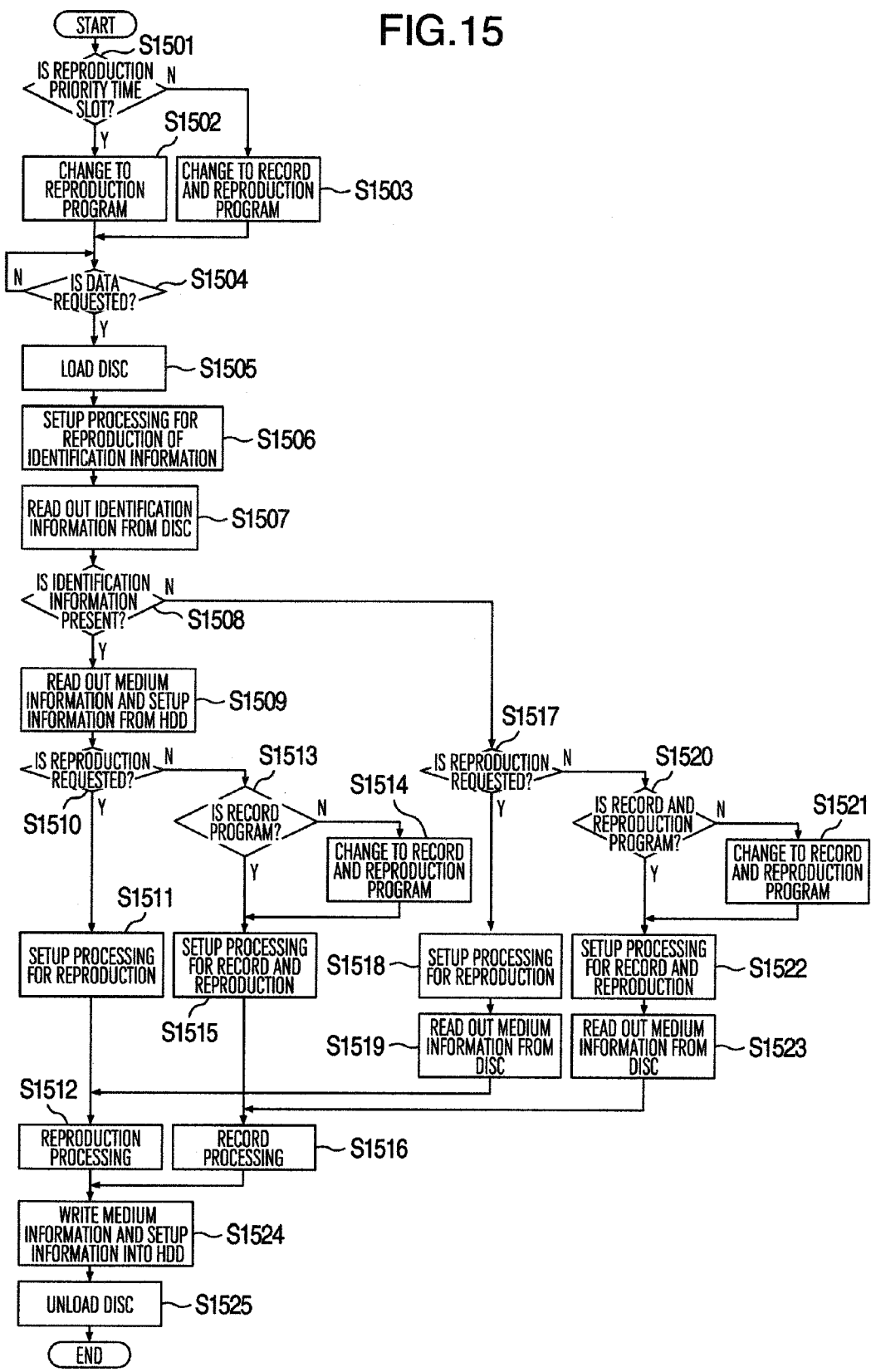
FIG. 15 is flowchart for explaining the operation of the data library device in the eight embodiment.

FIG. 15 is a flowchart showing an operation of the data library device 141 in the eighth embodiment. The processing checks whether the time period is for the reproduction priority time slot at a step S1501. If it is the reproduction priority time slot, the control program for the data recording and reproducing apparatus 111, 112, 113, 114 is changed to the data reproduction program at a step S1502. If it is not the reproduction priority time slot, the control program for the data recording and reproducing apparatus 111, 112, 113, 114 is changed to the data record and reproduction program at a step S1503.

If the data library device 141 has the data reproduction request or data record request at a step S1504, the corresponding optical disc 10 is loaded onto the data recording and reproducing apparatus 111, 112, 113, 114 at a step S1505.

The setup processing for the reproduction of the identification information is performed at a step S1506, and the identification information is read out from the optical disc 10 at a step S1507.

If the medium information and setup information corresponding to the identification information are present in the hard disc 105 at a step S1508, the medium information and setup information are read out from the hard disc 105 at a step S1509.

The processing checks whether the data request from the host computer is for the data reproduction at a step S1510. If it is the data reproduction request, the data reproduction setup processing is performed at a step S1511, and the data reproduction processing is performed at a step S1512. If it is the data record request, the processing checks whether the record program is applied to the control program at a step S1513.

In this regard, if it is checked that the data record and reproduction program is not applied to the control program for the data recording and reproducing apparatus 111, 112, 113, 114 at the step S1513, the control program is changed to the data record and reproduction program at a step S1514 to then perform the data record and reproduction setup processing at a step S1515.

The processing checks whether the data request from the host computer is for the data reproduction at a step S1517. If it is the data reproduction request, the data reproduction processing is performed at a step S1518. If it is the data record request, the processing checks whether the record program is applied to the control program at a step S1520.

If the medium information and setup information corresponding to the identification information are not present in the hard disc 105 at the step S1508, the processing checks whether the data request from the host computer is for the data reproduction at the step S1517. If the data request is the data reproduction request, the data reproduction setup processing is performed at the step S1518. The medium information and setup information are read out from the hard disc 105 at the step S1519, and the data reproduction processing is performed at the step S1512. If the data request is the data record request, the processing checks whether the record and reproduction program is applied to the control program of the data recording and reproducing apparatus 111, 112, 113, 114 at a step S1520. If the data request is the record and reproduction program, the data record and reproduction setup processing is performed at a step S1522. The medium information and setup information are read out from the hard disc 105 at the step S1523, and the data record processing is performed at the step S1516.

In this regard, if it is checked that the data record and reproduction program is not applied to the control program for the data recording and reproducing apparatus 111, 112, 113, 114 at the step S1520, the control program is changed to the data record and reproduction program at a step S1521 to then perform the data record and reproduction setup processing.

The medium information and setup information are written into the hard disc 105 together with the identification information at a step S1524, and the optical disc 10 is unloaded at a step S1525 to then terminate the processing.

In addition, this embodiment has been described as an example of the case where the medium information and setup information, written into the hard disc 105, of the respective optical discs 10 are specified by the identification information of the respective optical discs 10. In the data library device, the file system of respective optical discs is generally stored in the hard disc, therefore, the medium information and setup information may be specified in correspondence to this file system.

In the configuration of the eighth embodiment described above, the control program processing for the data recording and reproducing apparatus 111, 112, 113, 114 is switched in response to the time set previously in the timer 143, therefore, the reproduction program is applied to working hours to be able to perform an optimum data reproduction processing, and the record and reproduction program is applied to outside working hours to be able to perform an optimum data record.

Embodiment 9

Figure 16:
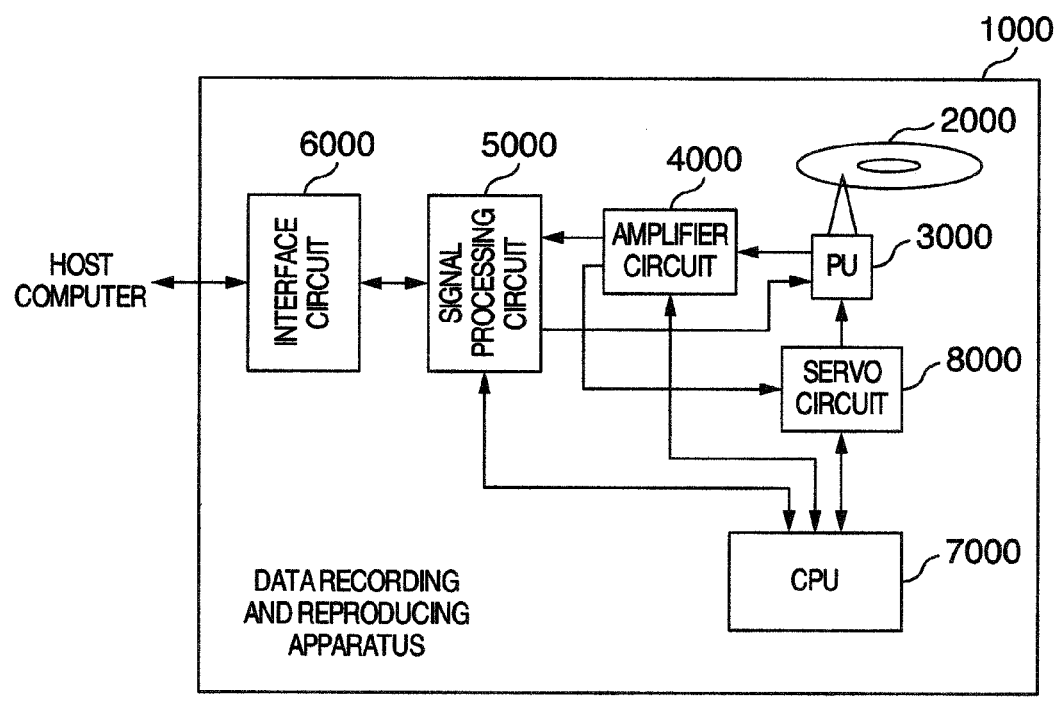
FIG. 16 is a block diagram showing the configuration of the data recording and reproducing apparatus in a ninth embodiment.

FIG. 16 is a block diagram showing the configuration of another data recording and reproducing apparatus in a ninth embodiment. A reference numeral 1000 denotes a data recording and reproducing apparatus to record the data, received from the host computer, in a recording medium, and supply the data reproduced from the recording medium to the host computer. A numeral 2000 denotes a data recording medium 2000, for example, BD-R (Blu-ray Disc Recordable). In addition, the data recording medium 2000 will be taken as an optical disc 2000 in the following description. The data recording medium is not necessarily limited to the optical disc 2000, but a magnet-optical disc, hologram, etc. may also be used as recording medium, which is not necessarily a disc shape.

A reference numeral 3000 denotes an optical pickup for reproducing a signal from the optical disc 2000 and sending it to an amplifier circuit 4000. The optical pickup 3000 also records a modulated signal sent from a signal processing circuit 5000 in the optical disc 2000.

The amplifier circuit 4000 amplifies a reproduced signal from the optical disc 2000 via the optical pickup 3000 to be sent to the signal processing circuit 5000, and also generates a servo signal to be sent to a servo circuit 8000. The amplifier circuit 4000 is mounted with AFE (Analog Front End), for example.

The signal processing circuit 5000 demodulates the received signal, releases the interleaving, performs the error correction, and send scramble released data to an interface circuit 6000. The signal processing circuit 5000 also applies the scramble to the data sent from the interface circuit 6000, appends the error-correcting code to the data, applies the interleaving to it, modulates it, and sends it to the optical pickup 3000.

The interface circuit 6000 sends the data sent from the signal processing circuit 5000 to the host computer and also sends the data sent from the host computer to the signal processing circuit 5000. The interface circuit 6000 performs the data transfer implemented in relation to the transmission mode, such as SATA (Serial Advanced Technology Attachment) etc.

A reference numeral 7000 denotes CPU for controlling the record processing and the reproduction processing of the data recording and reproducing apparatus 1000. The CPU 7000 also acquires setup information optimum for recording or reproducing the optical disc 2000. The CPU 7000 further reads out the identification information and medium information from the optical disc 2000. The identification information means the product number and serial number recorded in BCA (Burst Cutting Area) located on the inner circumference of optical disc 2000. The medium information means information required for when recording or reproducing the optical disc 2000, such as the disc type, defect management information, etc., and also information read out from the optical disc 2000 at every time of loading it. In addition, the CPU 7000 may be replaced with an arbitrary control circuit or dedicated circuit such as ASIC etc.

The servo circuit 8000 controls the optical pickup 3000 by a servo signal generated from the amplifier circuit 4000.

An operation of the data recording and reproducing apparatus 1000 will be described below when recording the data in the optical disc 2000. The CPU 7 reads out the identification information of the optical disc 2000 via the optical pickup 3000, amplifier circuit 4000 and servo circuit 8000 to acquire the setup information and set an optimum value in the servo circuit 8000, when loading the optical disc 2000 onto the data recording and reproducing apparatus 1000. The CPU 7 also reads out the medium information from the optical disc 2000 via the optical pickup 3000, amplifier circuit 4000 and signal processing circuit 5000. In addition, a processing for acquiring the setup information and medium information from the optical disc and for setting various points is generally referred to as a setup processing.

The host computer sends data to the data recording and reproducing apparatus 1000 to receive it by the interface circuit 6000. The signal processing circuit 5000 applies the scramble to the data, appends the error-correcting code to it, applies the interleaving to it, modulates it, and sends it to the optical pickup 3000 to record it in the optical disc 2000.

An operation of the data recording and reproducing apparatus 1000 will be described below when reproducing the data from the optical disc 2000. The CPU 7000 reads out the identification information of the optical disc 2000 via the optical pickup 3000, amplifier circuit 4000 and signal processing circuit 5000 when loading the optical disc 2000 onto the data recording and reproducing apparatus 1000. The CPU 7000 also acquires the setup information to set the optimum value in the amplifier circuit 4000 and servo circuit 8000. The host computer requests data to the data recording and reproducing apparatus 1000 to amplify a signal read out from the optical disc 2000 via the optical pickup 3000 by the amplifier circuit 4000. The signal processing circuit 5000 demodulates the data to release the interleaving, perform the error correction, release the scramble, and send the data to the host computer via the interface circuit 6000.

Figure 17:
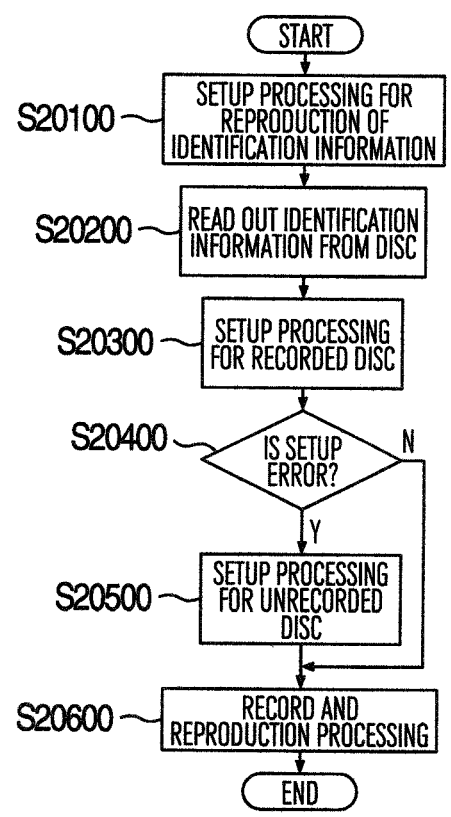
FIG. 17 is a flowchart for explaining the operation of the data recording and reproducing apparatus in the ninth embodiment.

FIG. 17 is a flowchart showing an operation of the data recording and reproducing apparatus 1000 in the ninth embodiment. The setup processing is performed for the reproduction of the identification information at a step S20100, when loading the optical disc 2000 onto the data recording and reproducing apparatus 1000, and the identification information is read out from the optical disc 2000 at a step S20200.

A recorded disc setup processing is performed at a step S20300. The recorded disc setup processing means a setup containing a processing for calculating various settings, as optimum values, when an amplitude value of the reproduced signal from a recorded data area becomes maximum. Any storage locations may be reproduced if an entire surface of the optical disc 2000 is recorded, therefore, a seek operation is not required in this case. In contrast, an unrecorded disc setup processing calculates the optimum value of the various settings by reproducing a pre-write area in a management area, but requires that the seek operation is repeated on the processing due to only 32 clusters. For this reason, the time period of the unrecorded disc setup processing becomes longer, compared with that of the recorded disc setup processing.

The processing checks whether a setup error occurs at a step S20400. If the setup error occurs, the optical disc 2000 is determined as the unrecorded disc to perform the unrecorded disc setup processing at a step S20500. The recorded disc setup processing reproduces the recorded data area as described above, therefore, the setup error occurs in the case of the unrecorded disc having no recorded data area. As a result, the optical disc 2000 can be determined as the unrecorded disc when the setup error occurs.

The data record and reproduction processing is performed in response to the data record and reproduction request from the host computer at a step S20600.

In the configuration of the ninth embodiment described above, the recorded disc setup processing is performed first when loading the optical disc 2000. If the setup error occurs, the optical disc 2000 is determined as an unrecorded disc to perform the unrecorded disc setup processing. The unrecorded disc setup processing is performed only when the setup error occurs, therefore, the time period of setup processing for the recorded disc 2000 can be shortened.

Embodiment 10

Figure 18:
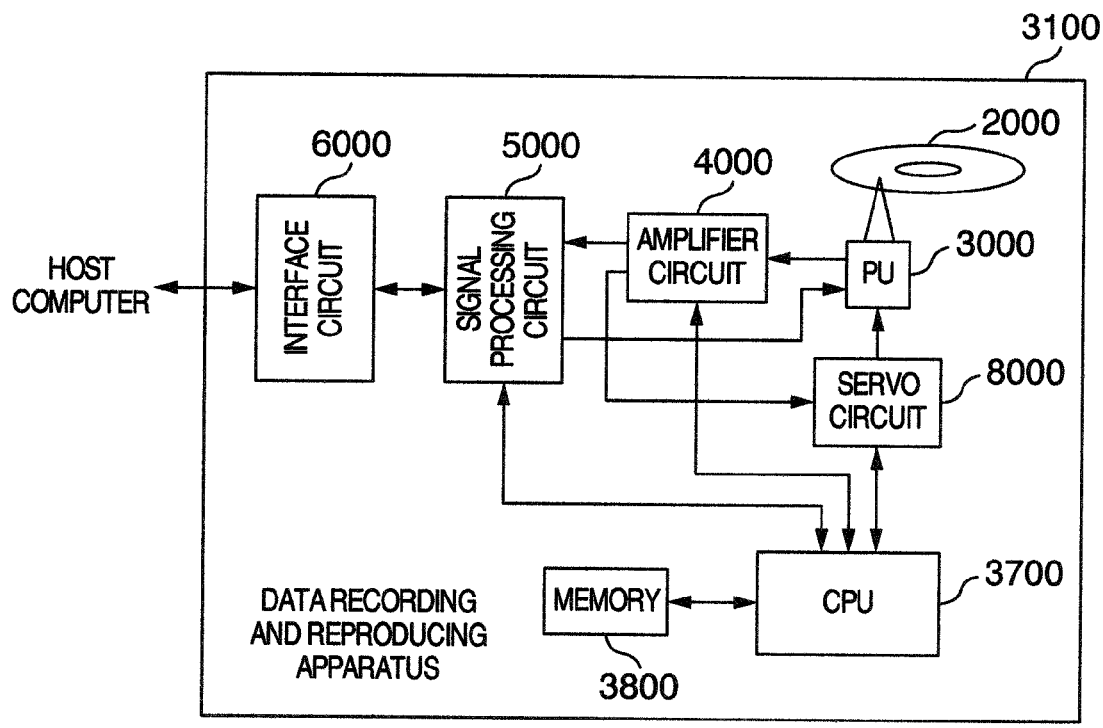
FIG. 18 is a block diagram showing the configuration of the data recording and reproducing apparatus in a tenth embodiment.

FIG. 18 is a block diagram showing the configuration of another data recording and reproducing apparatus in a tenth embodiment. A description for elements in FIG. 18 is omitted for those designating the same reference numerals in FIG. 16. A reference numeral 3100 denotes a data recording and reproducing apparatus to record data, received from the host computer, in a recording medium and supply the data reproduced from the recording medium to the host computer. A numeral 3700 denotes CPU for controlling the record processing and reproduction processing of the data recording and reproducing apparatus 3100 and also acquiring optimum setup information for recording and reproducing the optical disc 2000. The CPU also reads out the medium information from the optical disc 2000 to write it into a memory 3800 together with the identification information. The CPU further reads out the medium information corresponding to the identification information from the memory 3800. In addition, CPU may be replaced with the arbitrary control circuit and dedicated circuit such as ASIC etc.

The memory 3800 stores the medium information together with the identification information. The identification information means the product number and serial number recorded in BCA. The medium information means information such as an optical disc type, defect management information, etc. required for when recording and reproducing the optical disc 2000, and also information used to read out from the optical disc at every time of loading the optical disc in the past, for example.

In addition, the memory 3800 connected with CPU 3700 has been illustrated as an example, but may be connected inside or outside the data recording and reproducing apparatus 3100, and may also be incorporated in the host computer. The memory 3800 may be replaced with a hard disc, as held information.

An operation of the data recording and reproducing apparatus 3100 will be described below when recording data in the optical disc 2000. The CPU 3700 reads out the identification information of the optical disc 2000 via the optical pickup 3000, amplifier circuit 4000 and servo circuit 8000 to acquire the setup information and set the optimum value in the amplifier circuit 4000 and servo circuit 8000 when loading the optical disc 2000 in the data recording and reproducing apparatus 3100. The CPU 3700 also reads out the medium information from the optical disc 2000 via the optical pickup 3000, the amplifier circuit 4000 and a signal processing circuit 5000 to write it into the memory 3800 together with the identification information.

An interface circuit 6000 receives the data when sending the data from host computer to the data recording and reproducing apparatus 3100. The signal processing circuit 5000 applies the scramble to the data, appends the error-correcting code to it, applies the interleaving to it, modulates it, and sends it to the optical pickup 3000 to record it in the optical disc 2000.

An operation of the data recording and reproducing apparatus 3100 will be described when reproducing data from the optical disc 2000. The CPU 3700 reads out the identification information of the optical disc 2000 via the optical pickup 3000, amplifier circuit 4000 and signal processing circuit 5000, when loading the optical disc 2000 onto the data recording and reproducing apparatus 3100, to read out the corresponding medium information from the memory 3800, acquire the setup information and set the optimum value in the servo circuit 8000. The host computer requests data to the data recording and reproducing apparatus 3100 to amplify a signal read out from the optical disc 2000 via the optical pickup 3000 by the amplifier circuit 4000. The signal processing circuit 5000 demodulates the signal data, releases the interleaving, performs the error correction, releases the scramble, and sends the data to the host computer via the interface circuit 6000.

Figure 19:
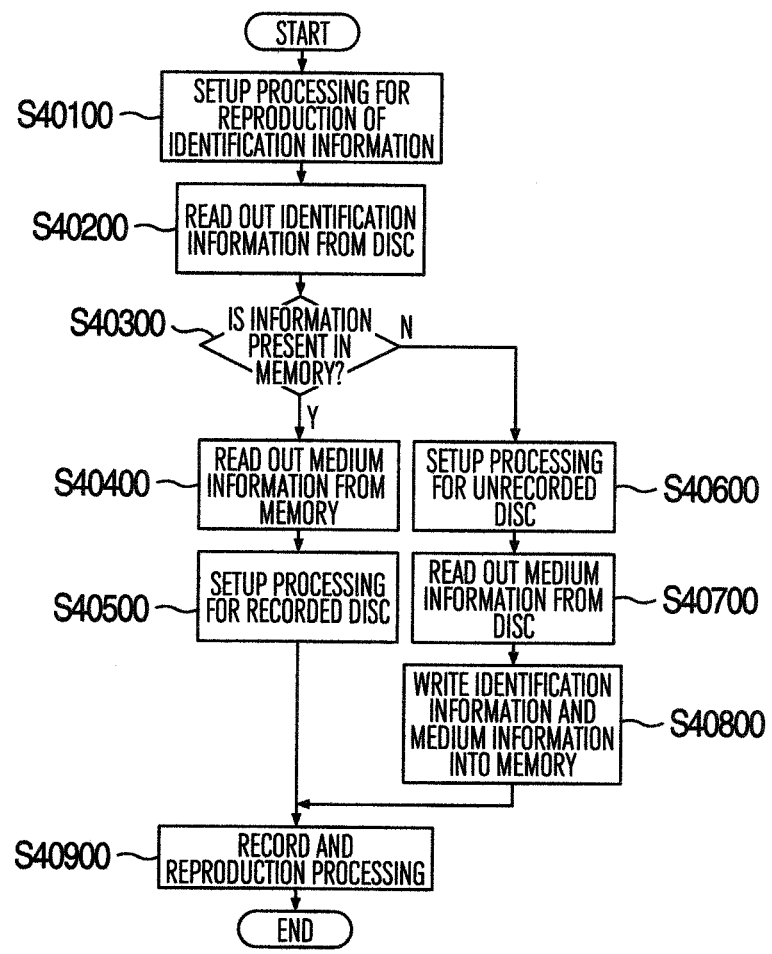
FIG. 19 is a flowchart for explaining the operation of the data recording and reproducing apparatus in the tenth embodiment.

FIG. 19 is a flowchart showing an operation of the data recording and reproducing apparatus 3100 in the tenth embodiment. The setup processing is performed for the reproduction of the identification information at a step S40100, when loading the optical disc 2000 onto the data recording and reproducing apparatus 3100, and the identification information is read out from the optical disc 2000 at a step S40200.

If the medium information corresponding to the identification information is present in the memory 3800 at a step S40300, the medium information is read out from the memory 3800 at a step S40400, and the recorded disc setup processing is performed at a step S40500. If it is not present in the memory 3800 at the step S40300, the unrecorded disc setup processing is performed at a step S40600. The medium information is read out from the optical disc 2000 at a step S40700, and the medium information is written into the memory 3800 together with the identification information at a step S40800.

The data record and reproduction processing is performed in response to the data record and reproduction request from the host computer at a step S40900.

In addition, the medium information is not present in the memory 3800 in the case of the first loaded optical disc 2000, thereafter, the medium information is read out from the optical disc 2000 to record in the memory 3800, which thereby records user data. Therefore, the medium information is present in the memory 3800 if the optical disc 2000 is not first loaded.

Figures 20, 21:
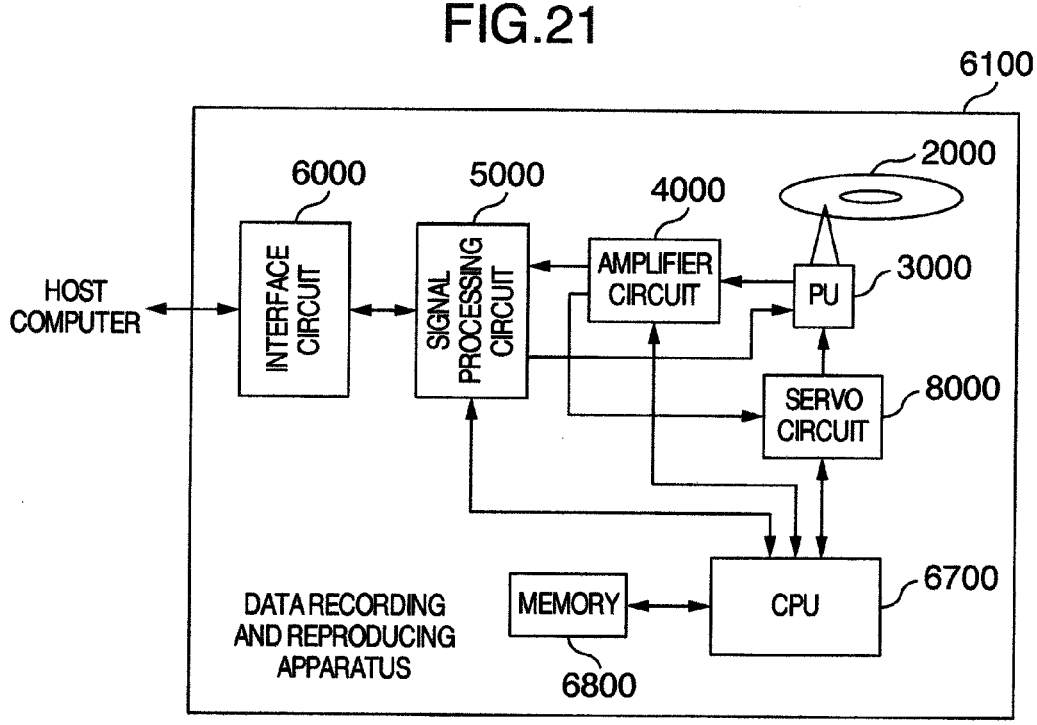
FIG. 20 is a table showing contents in a memory in the data recording and reproducing apparatus in the tenth embodiment.
FIG. 21 is a block diagram showing the configuration of the data recording and reproducing apparatus in an eleventh embodiment.

FIG. 20 is a table showing an example of the identification information and medium information written into the memory 3800 in the data recording and reproducing apparatus 3100 in the tenth embodiment. The medium information read out from the optical disc 2000 is written into the memory 3800 together with the identification information in advance. The medium information corresponding to the identification information is read out from the memory 3800 when the optical disc 2000 is loaded onto the data recording and reproducing apparatus 3100. The product number and serial number are recorded in the table as the identification information for every optical disc 2000, and the disc type and disc layer information are recorded in the table as the corresponding medium information. As another example, defect management information etc. may be recorded in the table, which is not shown in the table. If such medium information is recorded in the memory 3800, it is not required to read out the medium information again from the optical disc 2000. Therefore, the time period of reading out the medium information from the optical disc 2000 can be reduced at least.

In the configuration of the tenth embodiment described above, the medium information of the optical disc 2000 is written into the memory 3800 together with the identification information in advance. The setup processing is switched by whether the medium information corresponding to the optical disc 2000 is present in the memory 3800 when loading the optical disc 2000, so that the time period of the setup processing for the optical disc 2000 can be shortened. Further, the medium information is read out from the memory 3800, therefore, it is not required to read out the medium information from the optical disc 2000, so that the time period of the setup processing can be shortened, compared with that in the ninth embodiment.

Embodiment 11

FIG. 21 is a block diagram showing the configuration of another data recording and reproducing apparatus in an eleventh embodiment. A description for elements in FIG. 21 is omitted for those designating the same reference numerals in FIG. 16. A reference numeral 6100 denotes a data recording and reproducing apparatus to record data, received from the host computer, in a recording medium and supply the data reproduced from the recording medium to the host computer. A numeral 6700 denotes CPU for controlling the record processing and reproduction processing for the data recording and reproducing apparatus 6100. The CPU 6700 also acquires the optimum setup information for recording or reproducing the optical disc 2000 to write into a memory 6800 together with the identification information. The CPU 6700 further reads out the medium information from the optical disc 2000 to write likewise into the memory 6800. In addition, CPU 6700 reads out the setup information and medium information corresponding to the identification information from the memory 6800. The CPU 6700 may be replaced with the arbitrary control circuit and dedicated circuit such as ASIC etc.

The memory 6800 stores the medium information and setup information together with the identification information. The identification information means the product number and serial number recorded in BCA, for example. The medium information means information such as the optical disc type, defect management information, etc., required for when recording and reproducing the optical disc 2000, and also information used to be read out from the optical disc at every time of loading the optical disc in the past. The setup information means an optimum setting value and a learning result, such as a gain and offset of the amplifier circuit, an adjustment learning value of the servo, etc., when recording and reproducing the optical disc, and also information used to be acquired from the optical disc at every time of loading the optical disc in the past.

In addition, the memory 6800 connected with CPU 6700 has been illustrated as an example, but may be connected inside or outside the data recording and reproducing apparatus 6100, and may also be incorporated in the host computer. The memory 6800 may be replaced with a hard disc, as held information.

An operation of the data recording and reproducing apparatus 6100 will be described when recording data in the optical disc 2000. The CPU 6700 reads out the identification information of the optical disc 2000 via the optical pickup 3000, amplifier circuit 4000 and servo circuit 8000 to acquire the setup information and write into the memory 6800 together with the identification information. The CPU 6700 also reads out the medium information from the optical disc 2000 via the optical pickup 3000, the amplifier circuit 4000 and the signal processing circuit 5000 to write into the memory 6800 together with the identification information of the optical disc 2000.

The interface circuit 6000 receives data when sending the data from host computer to the data recording and reproducing apparatus 6100. The signal processing circuit 5000 applies the scramble to the data, appends the error-correcting code to it, applies the interleaving to it, modulates it, and sends it to the optical pickup 3000 to record in the optical disc 2000.

An operation of the data recording and reproducing apparatus 6100 will be described when reproducing data from the optical disc 2000. The CPU 6700 reads out the identification information of the optical disc 2000 via the optical pickup 3000, amplifier circuit 4000 and signal processing circuit 5000, when loading the optical disc 2000 onto the data recording and reproducing apparatus 6100, to read out the setup information and medium information from the memory 6800 and set in the amplifier circuit 4000 and servo circuit 8000. When the host computer requests data to the data recording and reproducing apparatus 6100, a signal read out from the optical disc 2000 via the optical pickup 3000 is amplified by the amplifier circuit 4000. The signal processing circuit 5000 demodulates the signal data, releases the interleaving, performs the error correction, releases the scramble, and sends the data to the host computer via the interface circuit 6000.

Figure 22:
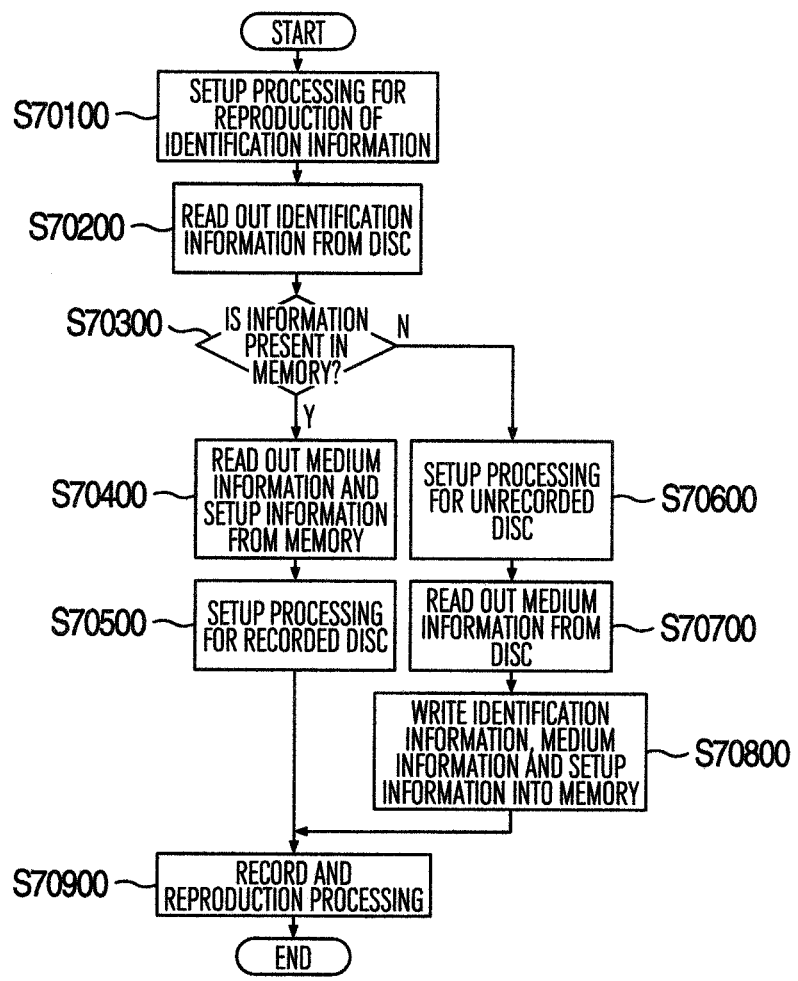
FIG. 22 is a flowchart for explaining the operation of the data recording and reproducing apparatus in the eleventh embodiment.

FIG. 22 is a flowchart showing an operation of the data recording and reproducing apparatus 6100 in the eleventh embodiment. The setup processing is performed for the reproduction of the identification information at a step S70100 when loading the optical disc 2000 onto the data recording and reproducing apparatus 6100, and the identification information is read out from the optical disc 2000 at a step S70200.

If the medium information and setup information corresponding to the identification information are present in the memory 6800 at a step S70300, the medium information and setup information are read out from the memory 6800 at a step S70400, and the recorded disc setup processing is performed at a step S70500. If the medium information corresponding to the identification information is not present in the memory 6800 at the step S70300, the unrecorded disc setup processing is performed at a step S70600. The medium information is read out from the optical disc 2000 at a step S70700, and the medium information is written into the memory 6800 together with the identification information at a step S70800.

The data record and reproduction processing is performed in response to the data record and reproduction request from the host computer at a step S70900.

In addition, the medium information and setup information are not present in the memory 6800 if the optical disc 2000 is first loaded, thereafter, the medium information is read out from the optical disc 2000 to write into the memory 6800, and the setup information acquired by performing the setup processing for the optical disc 2000 is written into the memory 6800, which thereby records the user data in the optical disc 2000. Therefore, the medium information and setup information are present in the memory 6800 if the optical disc 2000 is not first loaded.

FIG. 23 is a table showing an example of the identification information, medium information and setup information written into the memory 6800 in the data recording and reproducing apparatus 6100 in the eleventh embodiment. The medium information and identification information read out from the optical disc 2000 are written into the memory 6800 together with the identification information in advance. The medium information and setup information corresponding to the identification information are read out from the memory 6800 when the optical disc 2000 is loaded onto the data recording and reproducing apparatus 6100. The disc type and disc layer information are recorded in the table as the medium information for every optical disc 2000. As another example, the defect management information etc. may be recorded in the table, which is not shown in this embodiment. Such medium information is recorded in the memory 6800, therefore, it is not required to read out the medium information again from the optical disc 2000. For this reason, the time period of reading out the medium information from the optical disc 2000 can be reduced at least. The table also records TR (Tracking) adjustment value, FO (Focus) adjustment value and BE (Beam Expander) adjustment value as setup information for every optical disc 2000. Such setup information is written into the memory 6800 as a setup adjusted result. Therefore, the various adjustment processes can be reduced or simplified etc., and the time period of the setup processing for the optical disc 2000 can be shortened.

In the configuration of the eleventh embodiment described above, the medium information of the optical disc 2000 and setup information are written into the memory 6800 together with the identification information in advance. The setup processing is switched by whether the medium information and setup information corresponding to the optical disc 2000 are present in the memory 6800 when loading the optical disc 2000, so that the time period of the setup processing for the optical disc 2000 can be shortened. Further, the medium information is read out from the memory 6800, therefore, it is not required to read out the medium information from the optical disc 2000, so that the time period of the setup processing can be shortened, compared with that of the first embodiment. Furthermore, the setup information is read out from the memory 6800, therefore, the various adjustment processes etc. can be reduced, so that the time period of the setup processing for the optical disc 2000 can be shortened, compared with that of the second embodiment.

Embodiment 12

Figure 24:
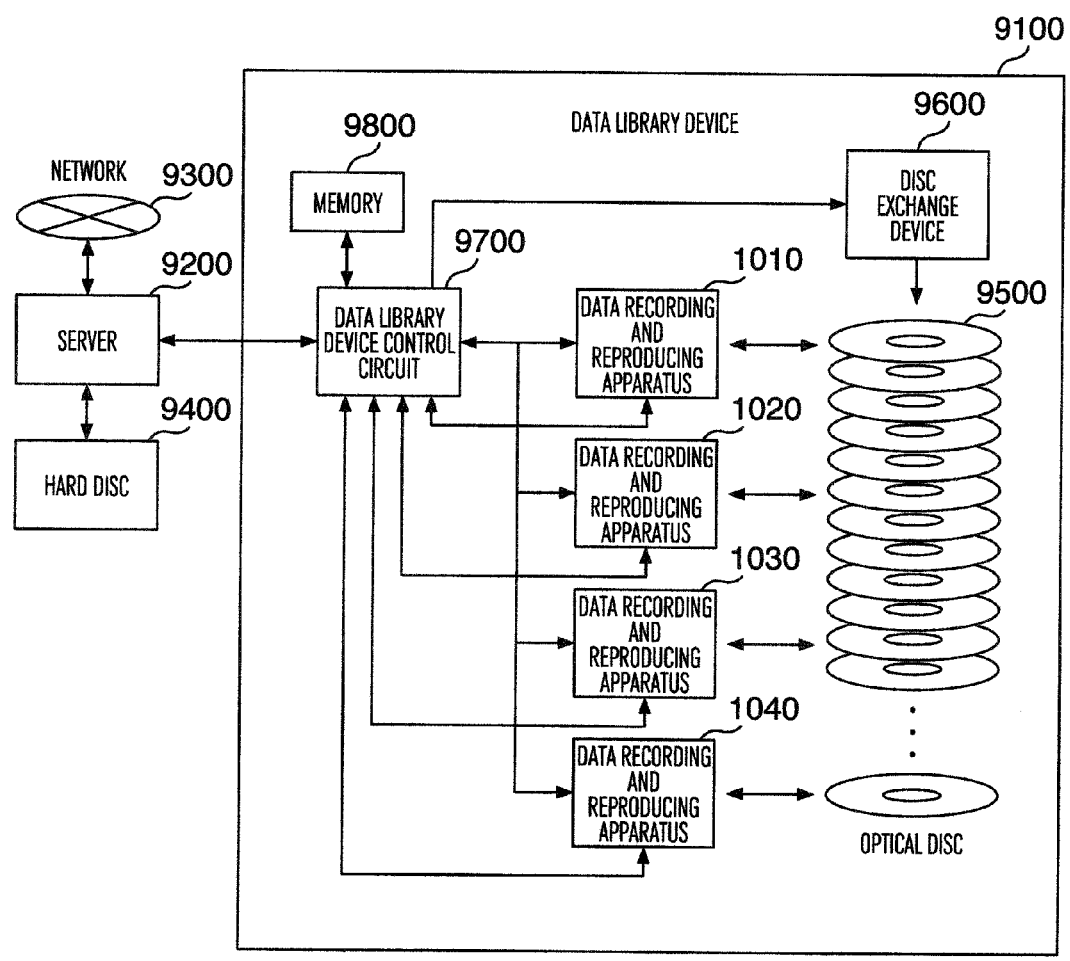
FIG. 24 is a block diagram showing the configuration of the data library device in a twelfth embodiment.

FIG. 24 is a block diagram showing another data library device in a twelfth embodiment. A reference numeral 9100 denotes a data library device to record data accumulated in a hard disc 9400, sent from a network 9300 via a server 9200, in optical discs 9500, or the data is reproduced from the optical discs 9500 to be sent to the network 9300 via the server 9200. The server 9200 controls the hard disc 9400 and the data library device 9100 to manage the data sent from the network 9300. The hard disc 9400 is controlled by the server 9200 to be subjected to the record and reproduction of the data sent from the network 9300.

The plural optical discs 9500 are incorporated in the data library device 9100. The optical discs 9500 are selected by an optical disc exchange device 9600 to be loaded onto data recording and reproducing apparatuses 1010, 1020, 1030, 1040 and record or reproduce the data. The data recording and reproducing apparatuses 1010, 1020, 1030, 1040 are controlled by a library device control circuit 9700 to record or reproduce the data for the optical discs 9500. The disc exchange device 9600 is controlled by the library device control circuit 9700 to exchange the optical disc 9500 to be loaded onto the data recording and reproducing apparatus 1010, 1020, 1030, 1040.

The library device control circuit 9700 controls the optical disc exchange device 9600 in response to a request from the server 9200 to select a desirable optical disc 9500 from among the plural optical discs 9500 and load onto the data recording and reproducing apparatus 1010, 1020, 1030, 1040.

A reference numeral 9800 denotes a memory for storing the medium information and setup information sent from the data recording and reproducing apparatuses 1010, 1020, 1030, 1040 via the library device control circuit 9700 together with the identification information. The library device control circuit 9700 reads out the medium information and setup information to send to the data recording and reproducing apparatus 1010, 1020, 1030, 1040. Further, an apparatus number for the data recording and reproducing apparatuses 1010, 1020, 1030, 1040 is corresponded to such as 1, 2, 3, 4, and this apparatus number is written into the memory 9800 as one of setup information. In this way, it is understood that the setup information of optical disc 9500 is acquired from the corresponding data recording and reproducing apparatus 1010, 1020, 1030, 1040, which can be used for a reference of the various adjustments. Alternatively, the setup information for every data recording and reproducing apparatus 1010, 1020, 1030, 1040 may all be written into the memory 9800.

Figure 25:
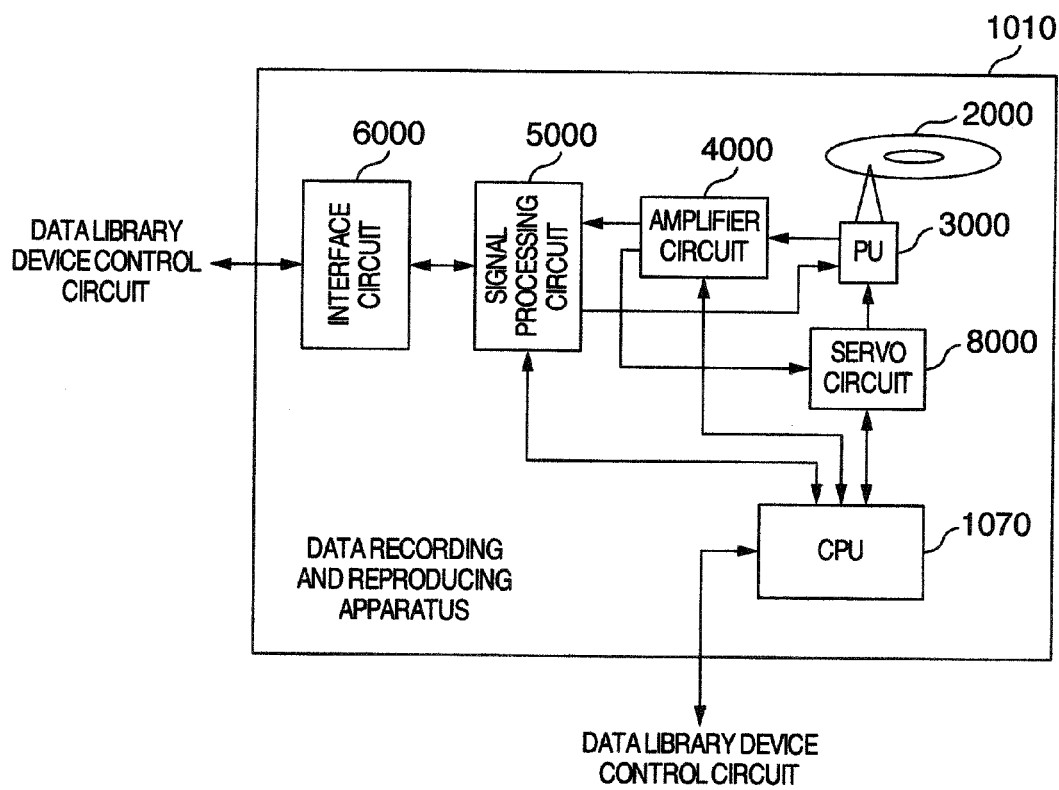
FIG. 25 is a block diagram showing the configuration of the data recording and reproducing apparatus in the twelfth embodiment.

FIG. 25 is a block diagram showing the configuration of the data recording and reproducing apparatus 1010 in the twelfth embodiment. A description for elements in FIG. 25 is omitted for those designating the same reference numerals in FIG. 16. The data recording and reproducing apparatus 1010 records data received from the library device control circuit 9700 in the optical disc 2000 and supplies the data reproduced from the optical disc 2000 to the library device control circuit 9700. A reference numeral 1070 denotes CPU for controlling the record processing and reproduction processing for the data recording and reproducing apparatus 1010. The CPU 1070 controls the record processing and reproduction processing of the data recording and reproducing apparatus 1010. The CPU also receives the medium information and setup information from the memory 9800 via the library device control circuit 9700 when loading the optical disc 9500 to supply the medium information and setup information to the memory 9800 via the library device control circuit 9700 when unloading the optical disc 9500.

In addition, the data recording and reproducing apparatus 1010 has been described above, but this description is also the same as that for the data recording and reproducing apparatus 1020, 1030, 1040.

Figure 26:
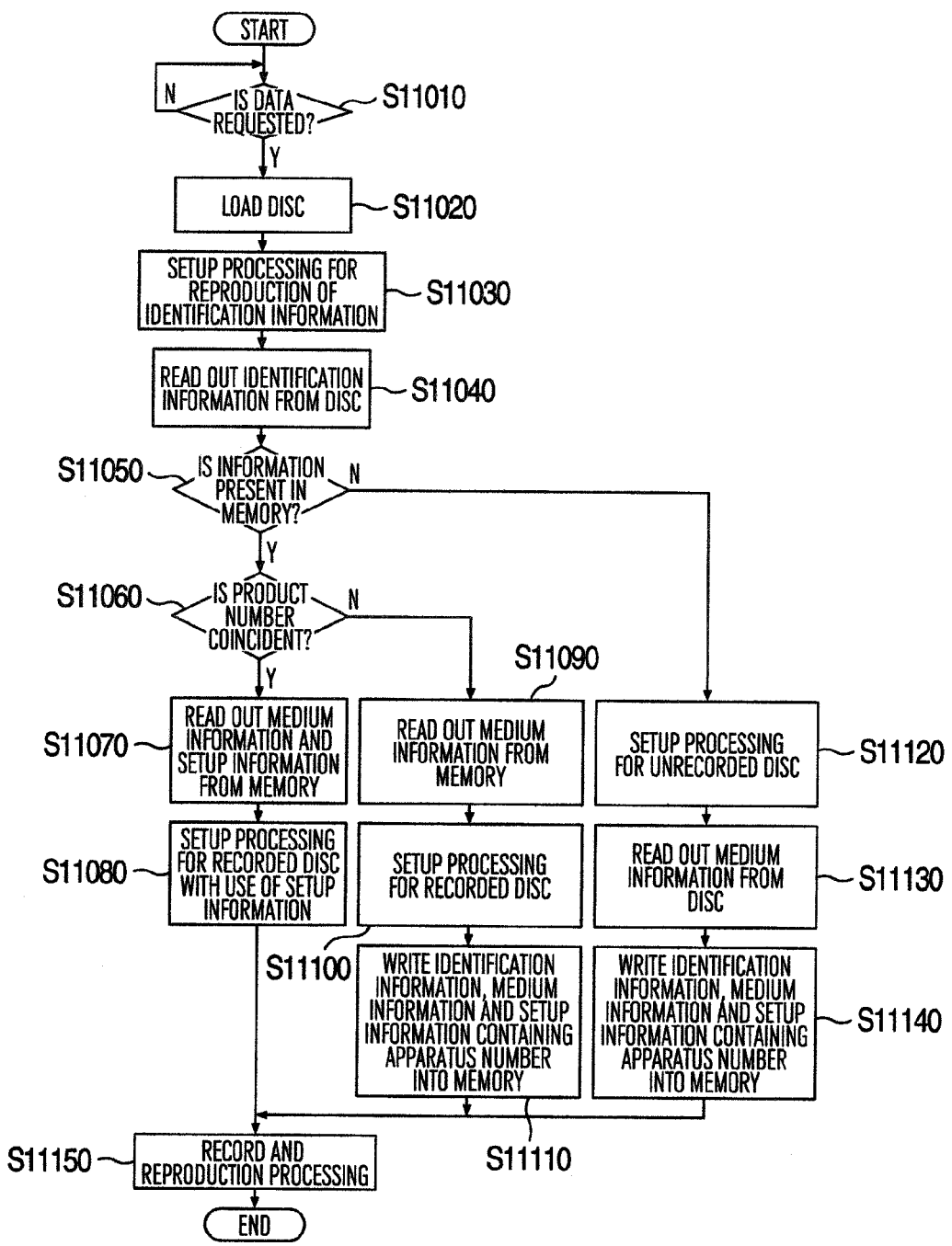
FIG. 26 is a flowchart for explaining the operation of the data library device in the twelfth embodiment.

FIG. 26 is a flowchart showing an operation of the data library device 9100 in the twelfth embodiment. If the data library device 9100 has the data reproduction request or data record request at a step S11010, the optical disc 9500 is loaded onto the data recording and reproducing apparatus 1010 at a step S11020. Here, it is assumed that the optical disc 9500 is loaded onto the data recording and reproducing apparatus 1010 of an apparatus number 1.

The setup processing for the reproduction of the identification information is performed at a step S11030, and the identification information is read out from the optical disc 9500 at a step S11040.

If the medium information and setup information corresponding to the identification information are present in the memory 9800 at a step S11050 and the apparatus number in the setup information is also coincident at a step S11060, the medium information and setup information are read out from the memory 9800 at a step S11070. Here, the example described above is applied to the case where the optical disc 9500 is loaded onto the data recording and reproducing apparatus of the apparatus number 1, therefore, the case where the apparatus number is coincident means that information of the apparatus number 1 is stored in the memory 9800. The recorded disc setup processing is performed by using the medium information and setup information read out from the memory 9800 at a step S11080. The setup information is the information of apparatus number 1 itself, therefore, the various setting values of the setup information can be set without change, and the optimum setting value can be calculated in short period of time by using the various setting values of the setup information as a center value.

If the medium information and setup information corresponding to the identification information are present in the memory 9800 at the step S11050 and coincident information of the apparatus number is not present at the step 11060, the medium information is read out from the memory 9800 at a step S11090. Here, the example described above is applied to the case where the optical disc 9500 is loaded onto the data recording and reproducing apparatus of the apparatus number 1, therefore, the case where information coincident with the apparatus number is not present means that the information of the apparatus number 1 is not stored in the memory 9800, but the information of the apparatus number 2, 3, 4 is stored therein. The recorded disc setup processing is then performed by using the medium information read out from the memory 9800, at a step S11100. The setup information containing the identification information, medium information and apparatus number is written into the memory 9800 at a step S11110.

Alternatively, the medium information and setup information are read out from the memory 9800 at the step S11090, and the recorded disc setup processing can be performed by using the medium information and setup information read out from the memory 9800 at the step S11100. However, the setup information is not the information of the apparatus number 1, therefore, the various setting values of the setup information cannot be set without change. This is because the optimum setting value of one data recording and reproducing apparatus is not exclusively adapted for that of the other data recording and reproducing apparatus. The optimum setting value can however be calculated by referring the various setting values of the setup information acquired by the other data recording and reproducing apparatus.

If the medium information corresponding to the identification information is not present in the memory 9800 at the step S11050, the unrecorded disc setup processing is performed at a step S11120. The medium information is then read out from the optical disc 9500 at a step S11130, and the setup information containing the identification information, medium information and apparatus number is written into the memory 9800 at a step S11140.

The data record and reproduction processing is performed in response to the data record and reproduction request from the host computer at a step S11150.

In a general use server, the data sent from a terminal connected with a network is recorded in a hard disc once, and the data is moved into the data library device in the case where a predetermined condition is satisfied, thereafter when an access is not come from the terminal for a predetermined period, etc. At this time, the data library device 9100 makes the unrecorded disc load onto the data recording and reproduction apparatus 1010, 1020, 1030, 1040 and record the data in the optical disc 9500. The medium information and setup information are not present in the memory 9800 in the case of the first loaded optical disc 9500. Thereafter, the medium information is read out from the optical disc 9500 to write into the memory 9800, and the setup information acquired by performing the setup processing for the optical disc 9500 is written into the memory 9800 to record the user data in the optical disc 9500. Therefore, the medium information and setup information are present in the memory 9800 if the optical disc 9500 is not first loaded.

FIG. 27 is a table showing an example of the identification information, medium information and setup information written into the memory 9800 in the data library device 9100 in the twelfth embodiment. The medium information and setup information read out from the optical disc 9500 are written into the memory 9800 together with the identification information in advance. The medium information and setup information corresponding to the identification information are read out from the memory 9800 when loading the optical disc 9500 onto the data recording and reproducing apparatus 1010, 1020, 1030, 1040. The medium information is written into the memory 9800, therefore, it is not required to read out the medium information again from the optical disc 9500, so that the time period of reading out the medium information from the optical disc 9500 can be reduced at least. The setup information is written into the memory 9800 as a setup adjusted result, therefore, the various adjustment processes can be reduced or simplified etc., and the time period of the setup processing for the optical disc 9500 can also be shortened. The apparatus number of the data recording and reproducing apparatus 1010, 1020, 1030, 1040 acquiring the setup information is written into the memory 9800, therefore, the setup processing can be switched by whether the corresponding apparatus number is present. The various setting values of the setup information are set without change if the corresponding apparatus number is present, and the optimum setting value can also be calculated in short period of time by using the various setting values of the setup information as the center value. The optimum setting value can be calculated by referring the various setting value if the corresponding apparatus number is not present.

For example, there are three pieces of the setup information for the disc type BD-R corresponding to the product number 126Ch and serial number 00001981h. That is, these information correspond to the apparatus number 1, 2, 4 in the setup information. When the optical disc 9500 is loaded onto the data recording and reproducing apparatus of the apparatus number 1, the setup information of the apparatus number 1 is read out to perform the setup processing. When the optical disc 9500 is loaded onto the data recording and reproducing apparatus of the apparatus number 2, the setup information of the apparatus number 2 is read out to perform the setup processing. When the optical disc 9500 is loaded onto the data recording and reproducing apparatus of the apparatus number 3, the setup information of the apparatus number 1 is referred to perform the setup processing.

In addition, this embodiment can also be reworded below. That is, the data library device for recording and managing data for a plurality of recording mediums provides a plurality of data recording and reproducing apparatuses that record and reproduce the data for the recording medium, a recording medium exchange device that exchanges the recording medium of the plurality of the data recording reproducing apparatuses, and a storage unit that stores identification information of the recording medium and setup information for each of the data recording and reproducing apparatuses. The plurality of the data recording and reproducing apparatuses provide respectively a plurality of setup methods of recording and reproducing the recording medium in a record and reproduction condition appropriate to the recording medium. When a data record processing or data reproduction processing is requested from a server, the corresponding recording medium is loaded onto one of the data recording and reproducing apparatuses by the recording medium exchange device. The identification information of the recording medium and the setup information for every data recording and reproducing apparatus are read out. When the identification information of the corresponding recording medium and the setup information for every data recording and reproducing apparatus are present, a first setup method is performed. When the identification information of the corresponding recording medium and the setup information for every data recording and reproducing apparatus are not present, a second setup method is performed. When the identification information of the corresponding recording medium is present, but the setup information for every data recording and reproducing apparatus is not present, a third setup method is performed.

In addition, this embodiment has been described such that the library device control circuit 9700 and the data recording and reproducing apparatuses 1010, 1020, 1030, 1040 are connected by a signal line other than SATA to send the identification information and medium information of the optical disc 9500 and the setup information, as an example, however, the signal line may be replaced with SATA.

This embodiment has been described such that the medium information of the optical discs and setup information are recorded in the memory 9800 in the data library device 9100, however, the memory may be located in any places, may be in the server 9200. The memory 9800 may also be replaced with the hard disc 9400 connected with the server 9200 if the information can be stored.

This embodiment has been described such that the medium information of the optical discs 9500 and setup information recorded in the memory 9800 are specified by the identification information of the optical disc 9500. The data library device generally records the file system of the optical discs in the hard disc, therefore, the medium information and setup information may be specified in correspondence to the file system.

In the configuration of the twelfth embodiment described above, the medium information of the optical disc 9500 and setup information are written into the memory 9800 together with the identification information in advance. The setup processing is switched by whether the medium information corresponding to the optical disc 9500 and setup information are present in the memory 9800 when loading the optical disc 9500, so that the time period of the setup processing for the optical disc 9500 can be shortened. Further, the medium information is read out from the memory 9800, therefore, it is not required to read out the medium information from the optical disc 9500, so that the time period of the setup processing can also be shortened.

The apparatus number, as one of the setup information, is recorded in the memory 9800 in advance. The setup processing is then switched by whether the setup information corresponding to the data recording and reproducing apparatus is present in the memory 9800 when loading the optical disc 9500, so that the time period of the setup processing for the optical disc 9500 can be shortened. The setup information is read out from the memory 9800, so that the various adjustment processes etc. can be reduced and the time period of the setup processing for the optical disc 9500 can also be shortened.

In addition, the invention is not limited to the embodiments described above and various changes and modifications may be included therein. The above embodiments have been described in detail with the configuration so as to easily understand the invention, therefore, all of the described configuration are not necessarily limited to the invention. A part of the configuration in one embodiment can be replaced with that in the other embodiment, and a part of the configuration in one embodiment can also be added to that in the other embodiment. A part of the configuration can be added to, deleted from and replaced with that in the respective embodiments.

The above described configurations, functions, processing units, etc. may be realized by a hardware configured by designing with integrated circuits in a part or entire part of that. The above described configurations and functions may be realized by software such that a processor executes programs for performing the functions. The information, such as the programs, tables, files, etc. for realizing the functions, may be stored in a storage device, such as a memory, hard disc, SSD (Solid State Drive), etc. or a recording medium, such as an IC card, SD card, etc.

The control line and information line are described as necessary for the explanation, therefore, all of the control lines and information lines required for an entire product are not necessarily shown in the drawings. Practically, almost all of the configurations are connected with each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data library device that records and manages data for a plurality of recording mediums, comprising:
 a plurality of data recording and reproducing apparatuses that record and reproduce the data for the recording medium;
 a recording medium exchange device that exchanges the recording medium for the plurality of data recording and reproducing apparatuses; and
 a storage unit that stores identification information of the recording medium and setup information for every data recording and reproducing apparatus, wherein
 the plurality of data recording and reproducing apparatuses provide a plurality of setup units that record and reproduce the data in a record and reproduction condition appropriate to the recording medium,
 the recording medium exchange device loads the recording medium onto one of the data recording and reproducing apparatuses when a server requests a data record processing or a data reproduction processing,
 the identification information of the recording medium and the setup information for every data recording and reproducing apparatus are acquired,
 if the identification information corresponding to the recording medium and the setup information for every data recording and reproducing apparatus are present, a first setup method is performed, and
 if the identification information corresponding to the recording medium and the setup information for every data recording and reproducing apparatus are not present, a second setup method is performed.

2. The device according to claim 1 wherein
 if the identification information corresponding to the recording medium and the setup information for every data recording and reproducing apparatus are present, the first setup method is performed,
 if the identification information corresponding to the recording medium is present and the setup information corresponding to the data recording and reproducing apparatus is not present, a third setup method is performed, and
 if the identification information corresponding to the recording medium and the setup information for every data recording and reproducing apparatus are not present, the second setup method is performed.

3. A data recording and reproducing apparatus configured to record data in a recording medium and reproduces the data from the recording medium, comprising:
 a plurality of setup units configured to record and reproduce the data in a record and reproduction condition appropriate to the recording medium; and
 at least one of a storage unit configured to store identification information and medium information of the recording medium, and a connector member connected to an external storage unit configured to store identification information and medium information of the recording medium;
 wherein a setup processing is performed by switching the plurality of setup units in response to the medium information corresponding to the identification information; and
 wherein
 the setup processing is performed by the first setup unit to reproduce the identification information from the recording medium when the recording medium is loaded,
 the medium information corresponding to the identification information is read out from the storage unit to perform the setup processing by a second setup unit when the medium information corresponding to the identification information is present in the storage unit, and
 the setup processing is performed by a third setup unit to reproduce the medium information from the recording medium and store in the storage unit together with the identification information when the medium information corresponding to the identification information is not present in the storage unit.

4. The apparatus according to claim 3 wherein
 the first setup unit is used for a reproduction of the identification information,
 the second setup unit is used for a data recorded medium, and
 the third setup unit is used for a data unrecorded medium.

5. A data recording and reproducing apparatus configured to record data in a recording medium and reproduces the data from the recording medium, comprising:
 a plurality of setup units configured to record and reproduce the data in a record and reproduction condition appropriate to the recording medium; and
 at least one of a storage unit configured to store identification information and medium information of the recording medium, and a connector member connected to an external storage unit configured to store identification information and medium information of the recording medium;
 wherein a setup processing is performed by switching the plurality of setup units in response to the medium information corresponding to the identification information; and
 wherein
 the setup processing is performed by a first setup unit to reproduce the identification information from the recording medium when the recording medium is loaded,
 the medium information and setup information corresponding to the identification information are read out from the storage unit to perform the setup processing by a second setup unit with use of the setup information when the medium information corresponding to the identification information is present in the storage unit, and
 the setup processing is performed by a third setup unit to store the acquired setup information in the storage unit together with the identification information, reproduce the medium information from the recording medium, and store in the storage unit together with the identification information when the medium information corresponding to the identification information is not present in the storage unit.

6. The apparatus according to claim 5 wherein
 the first setup unit is used for a reproduction of the identification information,
 the second setup unit is used for a data recorded medium, and
 the third setup unit is used for a data unrecorded medium.

7. A data recording and reproducing apparatus configured to record data in a recording medium and reproduces the data from the recording medium, comprising:
- a plurality of setup units configured to record and reproduce the data in a record and reproduction condition appropriate to the recording medium; and
- at least one of a storage unit configured to store identification information and medium information of the recording medium, and a connector member connected to an external storage unit configured to store identification information and medium information of the recording medium;
- wherein a setup processing is performed by switching the plurality of setup units in response to the medium information corresponding to the identification information;
- wherein
- the setup processing is performed by a first setup unit to reproduce the identification information from the recording medium when the recording medium is loaded, and
- the setup processing is performed by a third setup unit when the setup processing is performed by a second setup unit to cause an error; and
- wherein
- the first setup unit is used for a reproduction of the identification information,
- the second setup unit is used for a data recorded medium, and
- the third setup unit is used for a data unrecorded medium.

8. A data library device that records and manages data for a plurality of recording mediums, comprising:
- a plurality of data recording and reproducing apparatuses configured to record and reproduce the data for the recording medium;
- a recording medium exchange device configured to exchange the recording medium for the plurality of data recording and reproducing apparatuses; and
- a storage unit configured to store identification information of the recording medium,
- wherein
- the plurality of data recording and reproducing apparatuses provide a plurality of setup units configured to record and reproduce the data in a record and reproduction condition appropriate to the recording medium,
- the recording medium exchange device is configured to load the recording medium onto one of the data recording and reproducing apparatuses when a server requests a data record processing or a data reproduction processing,
- the identification information of the recording medium is acquired,
- if the identification information corresponding to the recording medium is present, a first setup method is performed, and
- if the identification information corresponding to the recording medium is not present, a second setup method is performed.

* * * * *